(12) United States Patent
Evans

(10) Patent No.: US 11,049,089 B2
(45) Date of Patent: *Jun. 29, 2021

(54) METHODS AND SYSTEMS FOR PAYMENT WITH A TRANSPONDER

(71) Applicant: Curtis A. Evans, Springfield, VA (US)

(72) Inventor: Curtis A. Evans, Springfield, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/700,290

(22) Filed: Apr. 30, 2015

(65) Prior Publication Data

US 2015/0317614 A1    Nov. 5, 2015

Related U.S. Application Data

(60) Provisional application No. 61/988,737, filed on May 5, 2014.

(51) Int. Cl.
*G06Q 20/32* (2012.01)
*G06Q 20/14* (2012.01)
(Continued)

(52) U.S. Cl.
CPC .......... *G06Q 20/32* (2013.01); *G06Q 20/145* (2013.01); *G06Q 20/325* (2013.01);
(Continued)

(58) Field of Classification Search
None
See application file for complete search history.

(56) References Cited

U.S. PATENT DOCUMENTS 6,253,956 B1    7/2001    Khan
6,263,316 B1 *  7/2001    Khan ................... G06Q 20/105
                                                    186/35

(Continued)

FOREIGN PATENT DOCUMENTS

JP      2004310663 A   * 11/2004
WO     WO2013019273      2/2013

OTHER PUBLICATIONS

"Quick Pick", Feb. 1, 2014, Random.org, http://web.archive.org/web/20140201072151/http://www.random.org/quick-pick/.*
"The World's Largest Bitcoin Lottery", Mason, James, Nov. 25, 2013, http://www.prnewswire.com/news-releases/the-worlds-largest-bitcoin-lottery----betcoin-prize---announced-by-bitcoin-gambling-innovator-betcoin-entertainment-233276991.html.*

(Continued)

*Primary Examiner* — Kambiz Abdi
*Assistant Examiner* — Scott Snider
(74) *Attorney, Agent, or Firm* — Michael Haynes PLC; Michael N. Haynes

(57) ABSTRACT

A payment system is provided comprising a transponder, an associated account with account settings, and transponder reading equipment/systems for electronic toll collection and electronic entry into contests, sweepstakes, games, and/or lotteries. Methods are provided to facilitate use of a transponder, an account, and related transponder reading equipment to simultaneously pay a toll and facilitate purchase of a lottery ticket. An account may be debited for a toll and a contest, game, or lottery entry, and credited if one is won. The payment method and system may be used to purchase goods, such as gasoline, and to simultaneously electronically enter contests, sweepstakes, games, and/or lotteries. The purchase of goods/services with a vehicle-mounted transponder may also employ use of rounding amounts to facilitate the electronic purchase of game or lottery tickets or entry to other contests, games, or sweepstakes, wherein the rounding amounts may aggregate to comprise an award that may be won.

20 Claims, 11 Drawing Sheets

(51) Int. Cl.
    *G06Q 50/34*     (2012.01)
    *G07F 17/32*     (2006.01)

(52) U.S. Cl.
    CPC ......... *G06Q 20/3278* (2013.01); *G06Q 50/34* (2013.01); *G07F 17/3255* (2013.01); *G06Q 2240/00* (2013.01)

(56) References Cited

U.S. PATENT DOCUMENTS

| | | | | |
|---|---|---|---|---|
| 6,366,220 | B1* | 4/2002 | Elliott | G06Q 10/087 340/10.1 |
| 6,394,343 | B1* | 5/2002 | Berg | G06K 7/0008 235/379 |
| 7,349,866 | B2 | 3/2008 | Schwarz | |
| 8,033,451 | B2 | 10/2011 | Schwarz | |
| 8,162,738 | B2 | 4/2012 | Erickson | |
| 8,397,988 | B1* | 3/2013 | Zuili | G07F 7/1008 235/383 |
| 8,754,751 | B1* | 6/2014 | Picolli | G07B 15/063 340/10.1 |
| 10,019,706 | B2* | 7/2018 | Geist | G07B 15/063 |
| 2002/0082085 | A1* | 6/2002 | Osterer | G06Q 30/02 463/42 |
| 2002/0145039 | A1 | 10/2002 | Carroll | |
| 2004/0039645 | A1* | 2/2004 | Walker | G06Q 10/087 705/16 |
| 2004/0242309 | A1* | 12/2004 | Melesko | G07F 17/329 463/18 |
| 2007/0029378 | A1* | 2/2007 | Begola | G06Q 20/363 235/380 |
| 2007/0142033 | A1* | 6/2007 | Deas | H04N 7/17318 455/411 |
| 2008/0109320 | A1* | 5/2008 | Kleinhans | G06Q 20/3278 705/26.1 |
| 2010/0222125 | A1* | 9/2010 | Nyman | G07F 17/32 463/17 |
| 2011/0105213 | A1* | 5/2011 | Irwin, Jr. | G07F 17/329 463/17 |
| 2011/0306399 | A1* | 12/2011 | Erickson | G06Q 20/20 463/17 |
| 2012/0089468 | A1* | 4/2012 | Guziel | G06Q 20/20 705/16 |
| 2013/0032635 | A1* | 2/2013 | Grinvald | G06Q 20/027 235/384 |
| 2013/0040738 | A1* | 2/2013 | Mikkelsen | G06Q 30/0633 463/41 |
| 2013/0103585 | A1* | 4/2013 | Carapelli | G06Q 20/32 705/44 |
| 2014/0206426 | A1 | 7/2014 | Aligizakis | |
| 2014/0274314 | A1* | 9/2014 | Cage | G07F 17/3255 463/25 |
| 2015/0095169 | A1* | 4/2015 | Lewis | G06Q 30/0643 705/15 |
| 2015/0112822 | A1* | 4/2015 | Aaron | G06Q 20/3572 705/17 |
| 2015/0199664 | A1* | 7/2015 | Buckman | G06Q 20/42 705/13 |

OTHER PUBLICATIONS

"Keep the Change Savings Program", Wells Fargo, archived on Mar. 15, 2014, http://web.archive.org/web/20140315015814/https://www.bankofamerica.com/deposits/manage/keep-the-change.go.*

Holohan, Dan, "EZ-PASS for charity?", HeatingHelp.com, Jan. 2005, https://forum.heatinghelp.com/discussion/85157/ez-pass-for-charity-dan-h (Year: 2005).*

Lou, Yingyan, Yafeng Yin, and Jorge A. Laval. "Optimal dynamic pricing strategies for high-occupancy/toll lanes." Transportation Research Part C: Emerging Technologies 19.1 (2011): 64-74. (Year: 2011).*

Kernicky, Kathleen, "Turnpike Service Plazas May Carry Lottery Tickets", South Florida Sun Sentinel, Jun. 24, 1990, https://www.sun-sentinel.com/news/fl-xpm-1990-06-24-9001150281-story.html (Year: 1990).*

IBTTA, "Progress Report of the Interoperability Committee of the International Bridge, Tunnel and Turnpike Association (IBTTA): "Migrating the U.S. Nationwide Electronic Tolling Interoperability"", Mar. 19, 2013, 8 pages, https://www.ibtta.org.

Jaffe, "You May Never Need to Pay Cash at a Tollbooth Again", Aug. 12, 2013, 5 pages, https://www.citylab.com/life/2013/08/you-may-never-need-pay-cash-tollbooth-again/6497/.

Kapsch, "Annual Report 2013/14", Mar. 31, 2014, 147 pages, https://www.kapsch.net.

Kapsch, "Brochures & Data Sheets", May 2, 2013, 2 pages, https://web.archive.org/web/20130502045429/http://www.kapsch.net/ktc/downloads.

Kapsch, "JANUS Driver Feedback Transponder", Feb. 5, 2013, 2 pages, www.kapsch.net.

Kapsch, "JANUS FME Exterior Transponder", Feb. 5, 2013, 2 pages, www.kapsch.net.

Kapsch, "JANUS Interior Transponder", Feb. 5, 2013, 2 pages, www.kapsch.net.

Kapsch, "Kapsch TrafficCom Opens TDM Protocol Press Release", Apr. 25, 2013, 2 pages, www.kapsch.net.

Kapsch, "Kapsch TrafficCom Statement of Qualifications to Indiana Finance Authority", Dec. 10, 2013, 45 pages.

Kenney, "Dedicated Short-Range Communications (DSRC) Standards in the United States—Abstract", Jul. 1, 2011, 4 pages, http://ieeexplore.ieee.org/document/5888501/.

Roberti, "What Type of Antenna Is Used in Electronic Toll Collection?", Mar. 31, 2014, 2 pages, http://www.rfidjournal.com/blogs/experts/entry?10969.

Swedberg, "Efforts to Aid Adoption of ISO 180000-6C RFID for Toll Collection Move Forward", Oct. 18, 2012, 3 pages, http://www.rfidjournal.com/articles/view?10038.

Thrasher, "RFIS vs. NFC: What's the Difference?", Oct. 11, 2013, 12 pages, https://blog.atlasrfidstore.com/rfid-vs-nfc.

Uckelmann & Brandwein, "RFID License Plates: A Successful In-Metal RFID Application", Feb. 27, 2012, 2 pages, http://www.rfidjournal.com/articles/view?9214.

Wilson, "History of EX-Pass", Sep. 20, 2011, 13 pages, http://roadpricing.blogspot.com/2011/09/history-of-ez-pass.html.

"Excerpts from USPTO File History for Grinvald U.S. Appl. No. 13/507,644", filed Feb. 7, 2013, 6 page(s).

"USPTO File History for Grinvald U.S. Appl. No. 13/507,644", filed Feb. 7, 2013, 363 page(s).

* cited by examiner

RoadGamePlay, Inc.

Account No.: QWERTY-9372
Name: John Q. Doe
Address: 1234 Main St., Tyler, TX
Phone: (555)123-4567
Driver's License No:
   TX-12345678
D.O.B: 01/20/1970
License Plate-Primary:
   TX ABC-987
Transponder-ID-No.:
   TxTag-A1B2C3D4E5
   TxTag-Z9Y8X7W6
   EZPass-REW719pN
Account Balance:
   $74.75
Funding Source: Charge card
   MC-4356-1234-4321-9874
   Exp. 01/2017
   CVV: 7654
Replenishment amount:
   $100

[ Edit ]

Game Selections

| | Game | Cost | Jackpot |
|---|---|---|---|
| ☐ | Powerball | $2.00/ea | $285 Million |
| ☐ | MegaMillions | $1.00/ea | $25 Million |
| ☐ | VA Lottery | $0.50/ea | $147,000 |
| ☐ | USA Roads | $0.25/ea | $150,000 |
| ☐ | SuperSpin | $0.25/ea | $1,000,000 |
| ☐ | SlotCar | $1.00/ea | $250,000 |
| ✓ | None | None | None |

Play a Game by selecting a box above!

"You should play a Game! You would have won a total of $10,450 if you had been playing SlotCar alone!"

[ View SlotCar Spin History ]

[ Return Home ]

Fig. 1

RoadGamePlay, Inc.

Account No.: QWERTY-9372
Name: John Q. Doe
Address: 1234 Main St., Tyler, TX
Phone: (555)123-4567
Driver's License No:
   TX-12345678
D.O.B: 01/20/1970
License Plate-Primary:
   TX ABC-987
Transponder-ID-No.:
   TxTag-A1B2C3D4E5
   TxTag-Z9Y8X7W6
   EZPass-REW719pN
Account Balance:
   $74.75
Funding Source: Charge card
   MC-4356-1234-4321-9874
   Exp. 01/2017
   CVV: 7654
Replenishment amount:
   $100

[ Edit ]

Game Selections

| | Game | Powerball | Cost | Jackpot |
|---|---|---|---|---|
| ✓ | 1x | Powerball | $2.00/ea | $285 Million |
| ✓ | 2x | MegaMillions | $1.00/ea | $25 Million |
| ✓ | 1x | VA Lottery | $0.50/ea | $147,000 |
| ✓ | 1x | USA Roads | $0.25/ea | $150,000 |
| ✓ | 4x | SuperSpin | $0.25/ea | $1,000,000 |
|   |    | None | None | None |

Apply this setting every [ 1 ] time(s) the transponder is read.

[ Return Home ]

Fig. 2

RoadGamePlay, Inc.

Powerball selections

Number Picker – choose 5

| 1 | 11 | 21 | 31 | 41 | 51 |
|---|---|---|---|---|---|
| 2 | 12 | 22 | 32 | 42 | 52 |
| 3 | 13 | 23 | 33 | 43 | 53 |
| 4 | 14 | 24 | 34 | 44 | 54 |
| 5 | 15 | 25 | 35 | 45 | 55 |
| 6 | 16 | 26 | 36 | 46 | 56 |
| 7 | 17 | 27 | 37 | 47 | 57 |
| 8 | 18 | 28 | 38 | 48 | 58 |
| 9 | 19 | 29 | 39 | 49 | 59 |
| 10 | 20 | 30 | 40 | 50 | 60 |

Powerball – choose one

| 1 | 11 | 21 | 31 | 41 | 51 |
|---|---|---|---|---|---|
| 2 | 12 | 22 | 32 | 42 | 52 |
| 3 | 13 | 23 | 33 | 43 | 53 |
| 4 | 14 | 24 | 34 | 44 | 54 |
| 5 | 15 | 25 | 35 | 45 | 55 |
| 6 | 16 | 26 | 36 | 46 | 56 |
| 7 | 17 | 27 | 37 | 47 | 57 |
| 8 | 18 | 28 | 38 | 48 | 58 |
| 9 | 19 | 29 | 39 | 49 | 59 |
| 10 | 20 | 30 | 40 | 50 | 60 |

1

Your selections - Powerball

2

Move

⇦ ⇨ 5, 7, 20, 50, 57 - 17    [Edit] [Remove]
⇦ ⇨ 1, 22, 28, 32, 49 - 19   [Edit] [Remove]
⇦ ⇨ 25, 29, 35, 44, 50 - 18  [Edit] [Remove]
       2, 19, 48, *, * - *    [Edit] [Remove]

[ Select another set of numbers ]

You will be assigned randomly selected numbers for wildcards and after each number set above has been used.
Good luck!

3

[ Select another game ]

Fig. 3

RoadGamePlay, Inc.

Account No.: QWERTY-9372
Name: John Q. Doe
Address: 1234 Main St., Tyler, TX
Phone: (555)123-4567
Driver's License No:
    TX-12345678
D.O.B: 01/20/1970
License Plate-Primary:
    TX ABC-987
Transponder-ID-No.:
    TxTag-A1B2C3D4E5
    TxTag-Z9Y8X7W6
    EZPass-REW719pN
Account Balance:
    $74.75
Funding Source: Charge card
    MC-4356-1234-4321-9874
    Exp. 01/2017
    CVV: 7654
Replenishment amount:
    $100

[ Edit ]

Account Activity

| | Numbers played | Powerball | Date |
|---|---|---|---|
| 12/27/13 to 1/3/14 | 5, 7, 20, 50, 57 - 17 | $2.00 | 12/29/13 12:02PM |
| | 1, 22, 28, 32, 49 - 19 | $2.00 | 12/30/2013 6:31AM |
| | 25, 29, 35, 44, 50 - 18 | WON $1000 | 12/30/5:43PM |
| 1/3/14 to 1/10/14 | 5, 7, 20, 50, 57 - 17 | $2.00 | 1/6/14 7:04PM |
| | 1, 22, 28, 32, 49 - 19 | WON $7 | 1/6/14 4:45PM |
| | 25, 29, 35, 44, 50 - 18 | WON $4 | 1/7/14 7:11AM |
| | 2, 19, 22, 35, 48 - 25 | $2.00 | 1/7/14 6:56PM |
| | 1, 3, 5, 7, 9 - 19 | $2.00 | 1/9/14 12:23PM |
| | 2, 4, 7, 8, 22 - 50 | $2.00 | 1/9/14 6:02PM |
| | 12, 13, 14, 16, 18 - 5 | WON $100 | 1/10/14 8:09AM |
| | 43, 46, 47, 48, 49 - 50 | $2.00 | 1/10/14 7:15PM |

[ Select New Numbers ]

[ See Toll Activity ]

Fig. 9

RoadGamePlay, Inc.

Account No.: QWERTY-9372
Name: John Q. Doe
Address: 1234 Main St., Tyler, TX
Phone: (555)123-4567
Driver's License No:
   TX-12345678
D.O.B: 01/20/1970
License Plate-Primary:
   TX ABC-987
Transponder-ID-No.:
   TxTag-A1B2C3D4E5
   TxTag-Z9Y8X7W6
   EZPass-REW719pN
Account Balance:
   $74.75
Funding Source: Charge card
   MC-4356-1234-4321-9874
   Exp. 01/2017
   CVV: 7654
Replenishment amount:
   $100

[ Edit ]

Account Activity - TxTag-A1B2C3D4E5

| Week | Toll | Time | Location |
|---|---|---|---|
| 12/27/13 to 1/3/14 | $4.00 | 12/29/13 12:02PM | SH 45 |
|  | $4.00 | 12/30/13 6:31AM | SH 45 |
|  | $4.00 | 12/30/13 5:43PM | SH 45 |
| 1/3/14 to 1/10/14 | $4.00 | 1/6/14 7:04PM | SH 45 |
|  | $4.00 | 1/6/14 4:45PM | SH 45 |
|  | $4.00 | 1/7/14 7:11AM | SH 45 |
|  | $4.00 | 1/7/14 6:56PM | SH 45 |
|  | $4.00 | 1/9/14 12:23PM | SH 45 |
|  | $4.00 | 1/9/14 6:02PM | SH 45 |
|  | $4.00 | 1/10/14 8:09AM | SH 45 |
|  | $4.00 | 1/10/14 7:15PM | SH 45 |

Account Activity - TxTag-Z9Y8X7W6

| Week | Toll | Time | Location |
|---|---|---|---|
| 12/27/13 to 1/3/14 |  | None |  |
| 1/3/14 to 1/10/14 |  | None |  |

Account Activity - EZPass-REW719pN

| Week | Toll | Time | Location |
|---|---|---|---|
| 12/27/13 to 1/3/14 |  | None |  |
| 1/3/14 to 1/10/14 |  | None |  |

[ See Game Activity ]

Fig. 10

METHODS AND SYSTEMS FOR PAYMENT WITH A TRANSPONDER

CROSS REFERENCE TO RELATED APPLICATIONS

This application is a utility patent application claiming priority to U.S. Provisional Patent Application 61/988,737, filed on May 5, 2014, entitled "Methods And Systems For Payment With A Transponder," which is herein incorporated by reference in its entirety.

BACKGROUND

Electronic toll collection (ETC) systems can allow a user to prepay an account from which road tolls are paid, eliminating the need to stop at a toll plaza to pay with coins or cash. One ETC system is operated using the trade name "E-ZPass". Certain systems generally have several components: a toll tag, which is typically a transponder placed inside a vehicle; an overhead antenna, which reads the toll tag and provides information for collection of the toll; video cameras to identify toll evaders, charging fines to evaders; and a network of computers to log toll tags being read and to reconcile toll payments from accounts. The brand "E-ZPass" is generally a source of origin mark for the roughly 25 agencies spread across approximately fourteen states that make up the E-ZPass Interagency Group (IAG).

Certain systems, comprising a network of computers, can maintain usage and/or an account balance for each user. An account statement itemizing toll usage and account balance can be sent to a user through the mail or by email. A user may also check account balances using an automated telephone system. In addition, a driver feedback display in toll lanes can display messages, such as "low balance," when an account reaches a pre-set threshold and needs to be replenished.

For accounts replenished by cash/check accounts, each time the prepaid toll balance drops below the low-balance threshold amount, a "low balance" message can be displayed in toll lanes as a reminder that the account needs to be replenished. For accounts funded by periodic charge card deposits, the system periodically can automatically charge the charge card for the replenishment amount. After the account has been established for 35 days, replenishment amounts can be re-evaluated every 90 days and adjusted, if necessary, to reflect current use patterns. Replenishment amounts can be calculated to equal one month of average use, based on use over the previous 90 days. Replenishment amounts can vary and timing of replenishment need not always be consistent.

A shortcoming in these existing electronic toll collection systems is that they generally function only to cause one payment from one payee to one payer for one service, namely payment from an account holder to a toll road authority, generally a state government agency, for the payment of a single toll. Another shortcoming is that money from toll collection primarily funds transportation projects, such as road, bridge, and tunnel construction and maintenance. Many consider tolls a mere nuisance and dislike paying them, and some tolls are continued to be collected long after the reason for which the toll was initially instituted has expired.

Unrelatedly, many state government entities operate lotteries, primarily as cash-based lotteries, to raise revenue for education and other purposes, while providing for the public an exciting opportunity to reap a financial award or even a windfall financial award. While lottery jackpots in multi-state games or lotteries can reach tens of millions of dollars, and often reach hundreds of millions of dollars, for example in the popular POWERBALL and MEGAMILLIONS branded lottery games, they remain limited cash-only lotteries. Cash-based lotteries are replete with shortcomings and inefficiencies. These inefficiencies include, among others, potential for theft or loss of tickets and cash, limited ability to attract players on a regular and recurring basis, limited sale locations and opportunities to make a purchase, inability to locate holders of winning tickets resulting in lost awards, high administrative costs, potential for fraud, delay in aggregating cash submitted to state lotteries, need to maintain equipment, terminals, and train staff to operate it, and so on.

It is one objective of the present disclosure to describe improved methods and payment systems to address shortcomings of existing electronic toll collection systems, as well as shortcomings in existing cash-based games, contests, sweepstakes, and lotteries. It is another objective of the present disclosure to describe improved methods and payment systems to facilitate transponder and pre-paid account-based entrance into games, contests, sweepstakes, and lotteries.

BRIEF DESCRIPTION OF THE DRAWINGS

FIG. 1 illustrates an account settings screen for an internet-accessible account in a payment system.

FIG. 2 illustrates an account settings screen for an internet-accessible account in a payment system.

FIG. 3 illustrates an account settings screen for an account, showing a list of lottery numbers the account holder has selected.

FIG. 9 illustrates an account settings screen for an account, showing account history, for an internet-accessible account in a payment system.

FIG. 10 illustrates an account settings screen for an account, showing account history, for an internet-accessible account in a payment system.

SUMMARY

Figure 4:
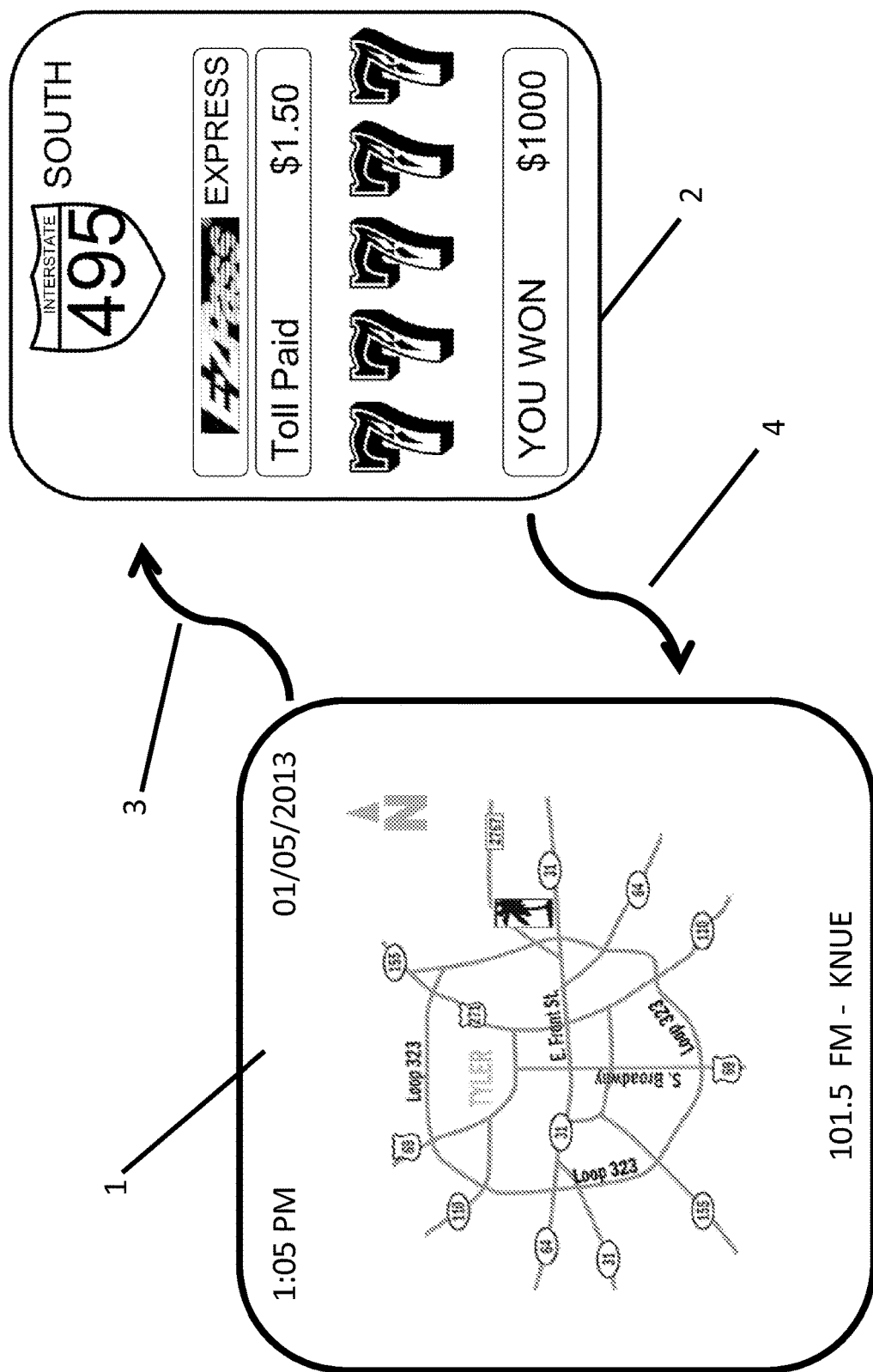
FIG. 4 illustrates an embodiment of a navigation screen in a vehicle displaying the result of a game played as part of a payment system.

In at least one contemplated embodiment, a payment system is provided comprising a transponder, such as a vehicle-mounted passive RFID transponder, and transponder reading equipment and systems for both electronic toll collection and electronic entry into games, contests, sweepstakes, and/or lotteries, wherein the transponder is linked to an account with account settings where the account holder specifies desired play of games, contests, sweepstakes, and/or lotteries.

In at least one embodiment, a payment system is provided comprising a transponder, such as a vehicle-mounted passive RFID transponder, and transponder reading equipment and systems for purchasing goods and/or services, such as fuel or gasoline, and for entry into contests, sweepstakes, and/or lotteries, wherein the transponder is linked to an account with account settings where the account holder specifies desired play of games, contests, sweepstakes, and/or lotteries. The purchase of goods/services with a vehicle-mounted transponder may also employ use of rounding amounts to facilitate the purchase of electronic lottery tickets, and the entry to other contests, games, or sweepstakes.

At least one embodiment comprises an electronic method for payment for initiating electronic participation in a lottery, contest, game, or sweepstakes, comprising: providing a transponder, wherein said transponder is associated to an account; positioning said transponder in reading vicinity of a transponder reader; reading data from said transponder, said data being communicated to a computer or network of computers; debiting an account associated with said transponder after said reading step to pay a toll; debiting an account associated with said transponder after said reading step to electronically enter a lottery, contest, game, or sweepstakes; and communicating, after said reading step, account data from an account to a gaming authority computer or network of computers, or communicating, after said reading step, data to an account from a gaming authority computer or network of computers.

At least one embodiment comprises payment system for paying tolls and electronically initiating participation in a lottery, contest, game, or sweepstakes, comprising: a transponder; a transponder reader capable of reading data from said transponder when located in a reading vicinity, wherein said transponder reader is configured to communicate with a computer or network of computers to facilitate toll collection; an account associated with said transponder, wherein said account is maintained on a computer or network of computers; software configured on non-transitory computer readable medium that functions to facilitate payment, from said account, of a toll in at least one toll collecting system, said payment being caused when said transponder is read by said transponder reader; and software configured on non-transitory computer readable medium that functions to facilitate payment, from said account, to a gameplay authority to facilitate purchase of electronic entry into a lottery, contest, game, or sweepstakes, said payment being caused when said transponder is read by said transponder reader.

At least one embodiment comprises a method for purchasing goods or services, comprising: providing a transponder, wherein said transponder functions in at least one toll collecting system and wherein said transponder is associated to a pre-paid account; positioning said transponder in reading vicinity of a transponder reader; reading data from said transponder, said data being communicated to a computer or network of computers; activating a fuel pump after said reading step; debiting an account associated with said transponder, after said reading step and after said activating step, for the cost of fuel pumped, and debiting an account associated with said transponder, after said reading step, to electronically enter a lottery, contest, game, or sweepstakes; and communicating, after said reading step, account data to a gaming authority computer or network of computers or communicating, after said reading step, data to an account from a gaming authority computer or network of computers.

At least one embodiment comprises a method for payment for initiating electronic participation in a lottery, contest, game, or sweepstakes, comprising: providing a transponder, wherein said transponder is associated to an account; positioning said transponder in reading vicinity of a transponder reader; reading data from said transponder; debiting an account associated with said transponder after said reading step to pay a toll; debiting an account associated with said transponder after said reading step to electronically enter a lottery, contest, game, or sweepstakes, wherein the sum debited in this debiting step is the difference between the cost of the toll if paid in cash and the cost of the toll if paid by transponder; and communicating, after said reading step, account data from an account to a gaming authority computer or network of computers, or communicating, after said reading step, data to an account from a gaming authority computer or network of computers.

At least one embodiment comprises a method for payment for initiating electronic participation in a lottery, contest, game, or sweepstakes, comprising: providing a transponder, wherein said transponder is associated to an account; positioning said transponder in reading vicinity of a transponder reader; reading data from said transponder; debiting an account associated with said transponder after said reading step to pay a toll; debiting an account associated with said transponder after said reading step to electronically enter a lottery, contest, game, or sweepstakes; and communicating, after said reading step, account data from an account to a gaming authority computer or network of computers.

At least one embodiment comprises a method for payment for initiating electronic participation in a lottery, contest, game, or sweepstakes, comprising: providing a transponder, wherein said transponder is associated to an account; positioning said transponder in reading vicinity of a transponder reader; reading data from said transponder; debiting an account associated with said transponder after said reading step to pay a toll; debiting an account associated with said transponder after said reading step to electronically enter a lottery, contest, game, or sweepstakes; and communicating, after said reading step, data to an account from a gaming authority computer or network of computers.

At least one embodiment comprises a method for payment for initiating electronic participation in a lottery, contest, game, or sweepstakes, comprising: providing a transponder, wherein said transponder is associated to an account; communicating data from said transponder, or from hardware in communication with said transponder, to a computer or network of computers; determining from said data a distance a vehicle has traveled; debiting an account associated with said transponder, after said communicating data step, to pay a toll; debiting an account associated with said transponder, after said communicating data step, to electronically enter a lottery, contest, game, or sweepstakes; and communicating, after said communicating data step, account data from an account to a gaming authority computer or network of computers, or communicating, after said reading step, data to an account from a gaming authority computer or network of computers.

At least one embodiment comprises an account settings interface for use in an electronic toll collection and gaming system, the account settings interface comprising: a selection area for account settings, wherein said account settings are configured to facilitate a setting selected from the group comprising: a selection of which lottery, contest, game, or sweepstakes to electronically enter from a set, facilitating entry into one or more lottery, contest, game, or sweepstakes; a selection of the quantity of electronic entries into each available lottery, contest, game, or sweepstakes to electronically enter; and a selection list of predetermined lottery numbers to play.

At least one embodiment comprises a method for traffic control using an electronic toll collection system, comprising: providing a transponder, wherein said transponder is associated to an account; providing a transponder reader to read a transponder traveling in a first travel lane; providing a transponder reader to read a transponder traveling in a second travel lane, wherein said first travel lane is a preferred travel lane over said second travel lane; reading data from a transponder in a travel lane, said data being communicated to a computer or network of computers; and providing an incentive for travel in said first travel lane over said second travel lane by either a) after said reading step, providing electronic entrance to a lottery, contest, game, or sweepstakes, wherein said electronic entrance is provided in said first travel lane but not in said second travel lane, or b) debiting an account associated with a transponder read in said second lane, and not in said first lane, after said reading step to pay a fine or toll.

At least one embodiment comprises a method of conducting a game, contest, or lottery comprising: operating a computer or network of computers to provide electronic entry to at least one game, contest, or lottery, wherein said computer or network of computers functions to facilitate an electronic entry purchase by use of an electronic toll collection system comprising a transponder, a transponder reader capable of reading data from said transponder, and an account associated with said transponder; and conducting on a computer or network of computers a game, contest, or lottery by determining a winner from the population comprising those having purchased an electronic entry.

At least one embodiment comprises an electronic method for payment for initiating electronic participation in a lottery, contest, game, or sweepstakes, comprising: providing a transponder, wherein said transponder is associated to an account; positioning said transponder in reading vicinity of a transponder reader; reading data from said transponder, said data being communicated to a computer or network of computers; debiting an account associated with said transponder after said reading step to pay a toll; debiting an account associated with said transponder after said reading step to electronically enter a lottery, contest, game, or sweepstakes, wherein the debit is a non-dollar denominated medium of exchange; and communicating, after said reading step, account data from an account to a gaming authority computer or network of computers, or communicating, after said reading step, data to an account from a gaming authority computer or network of computers.

DETAILED DESCRIPTION OF EXAMPLE EMBODIMENTS

This disclosure relates generally to transponder-based payment systems, and more specifically to use of a transponder and an associated account with account settings to conduct a financial transaction, such as paying a toll or purchasing fuel, while also electronically entering a lottery, contest, game, or sweepstakes. In at least one embodiment, a method is disclosed for electronically initiating participation in a lottery, game, contest or sweepstakes by virtue of using a transponder, such as a vehicle-mounted passive RFID transponder, to indicate a willingness by a motorist to pay a toll and to also purchase an electric lottery ticket, or similar contest entry, without the player having any paper receipt, lottery ticket, or bearer instrument. For example, an embodiment comprises providing a vehicle-mounted passive RFID transponder, such as a transponder that operates in an electronic toll collection system and has a unique identification number and an associated account; positioning said vehicle-mounted passive RFID transponder in reading vicinity of an RFID transponder reader, for example as one would do when driving under a transponder reader or antenna at a toll plaza; reading data from said vehicle-mounted passive RFID transponder; communicating that data to a computer or network of computers in an electronic toll collecting and gameplay system; debiting an account associated with said vehicle-mounted passive RFID transponder to pay a toll in at least one toll collecting system; and debiting an account associated with said vehicle-mounted passive RFID transponder to electronically enter a game, lottery, contest, or sweepstakes, for example with reference to an account's account settings, with payment being made directly from the account to a gameplay authority.

A toll-collecting authority receives from the account a payment of the toll in exchange for the vehicle being allowed to travel the road, bridge or tunnel, and a gameplay authority receives from the account a payment for the electronic lottery-type ticket (or other game or contest entry) in exchange for the gameplay authority issuing a lottery-type ticket to the account. The gameplay authority later conducts a lottery drawing (or game, contest, or similar), and determines from eligible lottery tickets whether there is an account holding a winning ticket. The lottery may be conducted with the population consisting of electronic lottery tickets only, or comprising both electronic lottery tickets and lottery tickets purchased in cash. If there is a winning electronic lottery ticket or tickets, the gameplay authority may pay winnings directly into the account, or to the funding source of the account.

Thus, motorists traveling roads, bridges, and tunnels and paying tolls using electronic toll collection systems, or similar systems, can simultaneously pay a toll and, voluntarily, pay to electronically participate in an electronic lottery, without using cash or receiving bearer instruments, merely by having a transponder and account (preferably with account settings), by driving through a toll plaza or driving on a toll road with transponder readers. By way of example, the "E-ZPass" branded electronic toll collection system can be changed to incorporate configurations, and to include new functionalities, described in the present disclosure.

For example, a motorist may be more likely to travel a toll road, and to pay the toll, if there exists the potential to win a prize or reward, such as a lottery jackpot, even if there is a charge or fee to participate and even if the odds of winning are very small. A toll road may display, for instance signage for a toll of $4.00, and a MEGAMILLIONS brand lottery ticket for $1.00 that may result in a jackpot of $50 million, or sometimes more. There are many motorists who would not mind the additional fee, and there are some who would opt for and prefer the convenience of purchasing a lottery ticket in this manner, rather than taking the time to participate in a cash-based game by buying a ticket at one of a limited number of lottery ticket vending locations.

Payment System Operating as "Opt-Out" or "Opt-In"

In an embodiment, the payment system is an "opt-out" system. That is, every participant in the electronic toll collection and gaming system is automatically enrolled in the lottery-ticket-type purchase option as a matter of default, where every toll paid via the transponder/reader payment system carries with it a charge for a lottery-type ticket. For example, by default when registering to use a toll payment system and being given an account, accessible by computer, the account settings default to a setting in which the user authorizes every toll payment to include a near simultaneous purchase of a lottery-type-ticket, for example a lottery ticket sold in the games known as POWERBALL (at $2.00 per ticket) or MEGAMILLIONS (at $1.00 per ticket).

Upon passing a toll plaza and having the transponder's identification number read into the computerized electronic toll collection system, for example, 1) the user's pre-funded account is debited for the amount of the toll, and the toll is paid to the toll collecting authority, 2) the user's pre-funded account is debited for the amount of the electronic lottery-type ticket, and the fee is paid to a gameplay authority, 3) an electronic lottery ticket is issued by the gameplay authority, and the electronic lottery ticket (and associated numbers for gameplay) is associated to the user's account from which payment for the lottery ticket was paid, and 4) the electronically issued lottery ticket (and associated numbers for gameplay) is communicated to the user's account and may be seen and tracked via the account settings window(s). As with a cash-based lottery, the user may follow the periodic drawing to determine if he has matching numbers to those drawn. Beneficially, however, the lottery ticket numbers are associated to a particular transponder and account, so the system administrator may immediately know the identity of the holder of the winning numbers and accounts. This reduces the likelihood of there being winning ticket owners that inadvertently fail to claim their prizes, among other accountability and convenience factors. There is no bearer instrument-type lottery ticket required to participate or win, nor is there a necessity to check to determine whether one has won, since the system operator notifies winners automatically.

In this "opt-out" system, the user may be provided the option not to participate. In one embodiment, to opt-out of the automatic purchase of a lottery ticket upon toll payment, the user can visit an internet-accessible account settings page, where the user may opt out of the payment system. FIG. 1 shows an account settings screen. In the right-hand box labeled "Game Selections" the user is shown to have checked the box "None" to indicate he does not desire to play any of the six exemplary games, contests or lotteries listed.

The option may be provided to the user in an account settings page to allow the user 1) to determine which contests, games, or lotteries to play, and 2) to determine the number of entries to purchase on each toll payment for each available game, contest or lottery. For example the user may instruct that three MEGAMILLIONS brand lottery tickets be purchased each time a toll is paid. The system administrator, or the account holder himself, may also limit the number of tickets that may be purchased at any one time, or in any certain period of time.

By way of illustration, FIG. 2 shows the user has elected to play all five games listed. FIG. 2 shows the user instructing the payment system to take the following actions (for example, each time his transponder is read): 1) to enter him into the game "Powerball" once, with the check mark next to the word "Powerball" indicating the game is being played, and the "1×" indicating the default value of "1" entry into the game, shown at a cost of "$2.00/ea"; 2) to enter him into the game "Megamillions" twice, with the check mark next to the word "Megamillions" indicating the game is being played, and the "2×" indicating the value of "2" that the user has manually entered or selected from a drop-down list, shown at a cost of "$1.00/ea"; and so on. FIG. 2 further shows the user instructing the payment system 3) to enter him into the game "VALottery" once; 4) to enter him into the exemplary game "USARoads" once; and 5) to enter him into the exemplary game "SuperSpin" four times. In addition, debiting an account associated with a transponder after a reading step to electronically enter a lottery, contest, game, or sweepstakes step may occur on a periodicity other than every time a toll is paid, said periodicity being determined by reference to an account's account settings. FIG. 2 shows an optional account settings screen feature allowing the account holder to determine the periodicity of game play as it relates to the number of times the transponder is read, for example in the section that reads "Apply this setting every "X" time(s) the transponder is read," where "X" is a variable number able to be selected by the account holder. For example, a lottery play may be initiated every time a transponder is read, every other time a transponder is read, every third time a transponder is read, and so on, according to the account setting selected in the account settings.

In another embodiment, the transponder itself may have a switch or button that disables the lottery-type ticket purchase option, so the motorist can determine in real-time whether or not to play by purchasing a lottery-type ticket, even without access to his online account settings. The motorist is provided the option to override account settings by a lock-out or an opt-out button on the transponder itself, which may function to change the data communicated between the transponder and a transponder reader. For example, if a user's account settings are set to facilitate purchase of an electronic lottery-type ticket each time the transponder is read at a toll plaza, the transponder may communicate to the reader its default signal comprising the following sample data: "Transponder-ID-Number='ABCDE12345'; LotteryTicket='On'". If, however, the motorist elects not to purchase a lottery ticket at a particular toll booth, despite his election is his account settings, a switch on the transponder may be switched to "Off", causing the transponder to communicate to the reader a signal comprising the following sample data: "Transponder-ID-Number='ABCDE12345'; LotteryTicket='Off'". This provides the user a simple, convenient way to opt out of making a purchase ancillary to the toll. The switch on the transponder which causes a data signal equivalent to LotteryTicket='Off' is generally referred to here as a "data communicating feature" of the transponder, but the "data communicating feature" should be understood to include any combination of hardware and/or software that functions to prevent a purchase ancillary to the payment of a toll, for example a lottery-type-ticket, or to override account settings.

Further, if the account settings are set to cause automatic purchase of a lottery-type ticket at each toll, yet the switch on the transponder is set to an override "LotteryTicket='Off'", a message may be sent to the user or the account or the transponder prompting the user to make a lottery ticket purchase at the next toll location by switching the transponder back to its default setting. Alternately, the transponder itself may recognize a "LotteryTicket='Off'" command to endure for a predetermined time, such as one toll only or one day only, before it returns to its default setting of "ON". That is, the data communicating feature, when activated, functions for either 1) a predetermined period of time (e.g. one hour, one day, 2 days, one week, or other defined time period as may be determined by the system administrator or, optionally, the account holder) or 2) a predetermined number of instances of communication with a transponder reader (e.g. for one toll only, for two tolls only, for five tolls only, for ten tolls only, or other defined number of instances when the transponder is read, as may be determined by the system administrator or, optionally, the account holder).

In an alternative embodiment, the payment system may be operated as an "opt-in" system, wherein account settings default to paying tolls only, but where the user may change the account settings to make other game, contest, or lottery-type purchases concurrent with toll payment, for example given sample account settings shown in FIG. 1 and FIG. 2.

The Transponder and Transponder Reading Equipment

In one embodiment, the transponder is a toll tag in an electronic toll collection system. One example is a passive RFID transponder. One example of a passive RFID transponder is an "E-ZPass" branded tag, which is made by Kapsch TrafficCom AG (IPTG), Vienna, Austria (also maker of transponders for open road tolling (ORT), multi-lane free-flow (MLFF) and high occupancy tolling (HOT)). This embodiment of a transponder is a piece of hardware that communicates with reader equipment built into lane-based or open-road toll collection lanes by reflecting back a unique radio signature. An exemplary transponder works, for example, by listening for a signal broadcast by the reader stationed at a tollbooth, though readers may be placed on any roadway in a multitude of locations, including in the roadway itself or in or on guardrails. One reader uses a 915 MHz signal sent at 500 kbit/s using the TDM (formerly IAG) protocol in 256-bit packets. One transponder embodiment uses active Type II read/write technology. The most common type of transponder tag can be mounted on the inside of the vehicle's windshield in proximity to the rear-view mirror, though some vehicles have windshields that block RFID signals. For those vehicles, historical vehicles, and customers who have aesthetic concerns, an externally mountable transponder may be offered, typically designed to attach to the vehicle's front license plate mounting points.

For purposes of interoperability, it might be preferable that toll-collecting authorities or agencies be connected to each other by a secure computer network (sometimes called the "reciprocity network"). This network provides the means to exchange transponder tag data and process toll transactions across the various agencies as well as lottery-type ticket purchases. Transponder tag data may be periodically exchanged among toll collecting agencies and/or gameplay authorities, for example on a nightly basis, or more frequently.

The term transponder is not intended to be limited to any particular brand ETC transponder embodiment. Certain transponder embodiments may not function on all toll roads in the United States, though it may be beneficial if a transponder does function in a number of states. By way of illustration, the E-ZPass electronic toll-collection system (as well as the other ETC systems that are part of the E-ZPass network) may not be compatible with Florida systems (including SunPass and E-Pass), California's FasTrak, Kansas's K-Tag, Oklahoma's Pikepass, Texas's TxTag, Utah's Express Pass, Puerto Rico's AutoExpreso, Georgia's Peach Pass and Cruise Card, or other ETC systems outside of E-ZPass operating regions, though each of the preceding systems should be understood to use an embodiment of a transponder. A transponder in one ETC system need not be compatible with any other ETC system. It is believed that the legal requirement exists that all ETC facilities in the United States must reach some form of interoperability by Oct. 1, 2016. The preferred embodiment of the payment system includes a functioning transponder (preferably conforming with interoperability requirements), a transponder reader, a computer or network of computers to coordinate accounts and payments, and capability to substantially simultaneously pay a toll and to electronically enter a lottery, game, contest, sweepstakes or raffle without need for paper tickets, receipts, or financial instruments known as bearer instruments.

Other embodiments of a transponder include a fixed but detachable vehicle-mounted passive RFID transponder unit; a transponder integrated into the vehicle's construction, for example by integration into the windshield, rear view mirror, side-view mirror, headliner, bumper, vehicle trim or similar; a license plate with transponder; and a sticker periodically affixed to a vehicle, for example to indicate a county tax has been paid or to indicate a periodic emissions or safety inspection has been completed. Transponder embodiments also comprise devices used in RFID-based ETC Systems; devices used in DSRC (Dedicated Short Range Communication) based ETC Systems (by way of further example to include node-based systems, comprising vehicles and roadside stations, using communications in the 5.9 GHz band with bandwidth of 75 MHz and approximate range of 1000 m); devices used in intelligent transportation systems (ITS) or vehicle to vehicle ("V2V") systems; near field communication (NFC) based devices; and hardware and/or software used in global navigation satellite system (GNSS)/Cellular (GPS) based ETC Systems (the class being generally referred to here as satellite based navigation-type transponders). One of skill in the art may appreciate a multitude of hardware and software configurations, and any other embodiments, even if not listed, may be suitable for use.

In an embodiment, each transponder has an identifier, such as a serial number or a unique series of alphanumeric characters, or an encrypted version thereof, and each transponder's identifier is associated to an account. One account may have associated with it more than one transponder. For example, the head of a household may have more than one vehicle registered in his or her name, and each of the vehicles may have a transponder that is associated with a single account.

A transponder reader should be generally understood to comprise hardware and/or software to communicate with a transponder or to read data from a transponder. Embodiments include an antenna or antenna array, [such as used in certain branded ETC systems], and a computer or network of computers configured to communicate over wireless network to receive data, though those of skill in the art understand there to be many other suitable embodiments.

Eligibility Numbers for a Contest, Game, Lottery or Sweepstakes

In some embodiments, contest eligibility numbers are provided for a lottery-type drawing once a user has brought a transponder within reading distance of a reader. For convenience, the word "lottery" or "lottery-type ticket" is sometimes used here to denote eligibility for a contest, game, or lottery, although a game or contest drawing itself is sometimes a distribution of funds from an aggregate donation pool and may not necessarily meet the legal definition of "lottery", for example on privately owned toll roads. Lottery-type numbers may be randomly assigned to each transponder/account that passes a reader within a prescribed time period. That is, each time a transponder is read by a reader, a new set of randomly generated lottery numbers is purchased or sent to the account. Alternatively, the account holder may select his own numbers in an interface as part of his account settings, as one would select numbers for a cash-based lottery by filling out by hand a machine-readable entry slip having bubbles filled in by pencil or ink pen. In the account settings, the account holder may enter his preferred lottery-number selection or selections, playing consistently a set of favorite number combinations or multiple sets of number selections the user predetermines.

FIG. 3 shows an example of a number-picker interface 1, here depicted as comprising two instances of a lottery number matrix; and a list of number selections 2 that the user has made. From the number picker interface 1, the user selects five numbers from the top matrix of numbers 1-60, and one number from the bottom matrix of numbers 1-60, and the numbers selected appear in the list of number selections 2. The list of number selections 2 shows four series of numbers, each series comprising a set of lottery numbers for gameplay. Here, the user has elected to electronically purchase a lottery ticket, concurrent with the first toll payment, having the numbers "5, 7, 20, 50, 57-17". The second lottery ticket purchased, concurrent with the next toll payment, will be the next entry on the list, and so on. Once all four preselected sets of numbers on the list have been used, the next electronic lottery ticket will have numbers provided by random number generator, shown and described by message 3. Buttons are shown in the account settings window to change the order of the list, to edit/remove an entry from the list, to select another set of numbers to add to the list, or to select another game other than the one shown, here "Powerball". In another embodiment, rather than providing the electronic lottery tickets sequentially from the list and then by random number generator thereafter, each electronic lottery ticket is provided from the list, but in random order, then upon exhaustion of the list, by random number generator.

Further, the lottery number matrix may be used to select only a few numbers on any one lottery ticket, with the remaining numbers being selected randomly by computer. For example, a user may specify from the matrix only the numbers "2, 19, 48", corresponding to a favorite birthday perhaps, but leave the remaining numbers empty for the computer to select randomly. FIG. 3 shows the fourth set of lottery numbers comprising three wildcards, each represented by the character "*", and the computer randomly selects a number for each wildcard.

For security and accountability, the gameplay authority when issuing the electronic lottery-type ticket may utilize a transaction number. One embodiment of the transaction number comprises a function of the transponder identifier or account number, the lottery-type ticket numbers for gameplay, an encryption key held by the gameplay authority, and a time/date/location where the transponder was read. By using encryption, or a series of encryption functions, a winning set of lottery-type ticket numbers for gameplay may be rendered safe, secure, and subject to verifiable accounting procedures. This facilitates winnings being consistently and verifiably paid, as opposed to paper lottery ticket-type lotteries where paper tickets are replete with shortcomings (e.g. theft, loss, fraud, inadvertent destruction, illegibility, printing irregularities, attempted redemption outside a prescribed time period, ownership issues regarding a paper lottery ticket as a bearer instrument for example when multiple people pool money to buy a number of tickets ostensibly through one agent to split the winnings should any one ticket win, and so on).

Eligibility numbers may also be provided as part of a sweepstakes, for example if no purchase over and above the payment of a toll is made, or if no purchase whatsoever is made but a reader is able to read a transponder. That is, a portion of toll proceeds, or another source of funding or set of rewards, may be used as an incentive to reward participants in the sweepstakes. For example, there may be a toll that costs $1.25 if paid in cash, with $0.25 of that being used to pay human toll collector salaries and related cash handling overhead expenses, whereas the same $1.25 toll if paid via transponder and account may channel $0.25 into an aggregate pool to be used for prizes and rewards.

Alternately, the cost to enter the lottery or raffle may be determined by determining the difference between the cost of the toll if paid in cash and the cost of the toll if paid by transponder. That is, a $1.25 cash toll might be a $1.00 transponder-based toll, with the account being charged $0.25 for entry into the lottery or contest to provide the motorist the appearance that there is an additional benefit to using a transponder over cash.

As another example, a payment system operator may elect to keep a toll at a static price, but to vary a potential sweepstakes reward amount as incentive to travel in a certain lane, on a certain toll road, or at a certain time. If a motorist has a belief that he may win a sweepstakes by virtue of travelling a toll road, he may be more likely to travel the toll road than if the sweepstakes potential did not exist.

By way of another example, the reward offered may be money, or it may be something other than money such as toll-free passage on a toll road for a predetermined amount of time, such as one week. Other rewards may be provided, such as coupons, tax credits, and safe driving discounts, for example if a motorist maintains a predetermined speed as measured by the time it takes the vehicle to travel between two sets of transponder readers. Those of skill in the art will appreciate different embodiments for the reward, all of which are considered to be included within this disclosure.

Payment System as a Lottery or Game of Chance

In another embodiment, government entities may operate a lottery operated in concert with toll collection, for the same purposes other state lotteries are offered to the public, namely to raise proceeds for the government and to distribute a portion of the proceeds to the public in a game of chance.

In this embodiment of a system, method, or business method, assuming a government entity is involved and appropriate laws and regulations allow, each toll payment allows the motorist to, in essence, purchase an electronic lottery ticket by virtue of passing a transponder by a transponder reader and thereby authorizing a prefunded account to be debited for the cost of the electronic lottery ticket. Providing a large group of motorists a fun game while paying tolls may raise more revenue than traditional cash-only state-run lotteries, and it may have beneficial impact on traffic patterns such as increasing transponder use and reducing queuing of traffic in cash-only toll lanes.

Because certain lotteries operating in particular jurisdictions may be legally prohibited from selling gaming or lottery tickets where the ticket is purchased by credit card, amounts may be debited from a pre-funded account associated to a transponder. This pre-funded account may be tied to a funding source such as a cash deposit, a credit or debit card account (or a checking or saving account, or similar), it can be periodically replenished so as to avoid a zero balance, and in general the electronic toll and gaming system may be operated to comply with all applicable laws. A portion of the account may also be funded in a non-dollar denominated medium of exchange, or the account may be configured to redeem dollars for a non-dollar denominated medium of exchange, facilitating a payment to a gameplay authority in a non-dollar denominated medium of exchange. For example, the payment system using the account may function to pay tolls in dollars to a toll collecting authority, but to pay a gameplay authority in a non-dollar denominated medium of exchange, for example digital currency (such as Bitcoin (BTC), Litecoin (LTC), Feathercoin (FTC), Terracoin (TRC), Namecoin (NMC), Novacoin (NVC), or similar), gold, e-gold, digital credits, frequent flier miles, loyalty points, or similar stores of value. For example, the Washington Metropolitan Airports Authority may operate a payment system on the Dulles Toll Road in Northern Virginia in conjunction with an American Airlines promotion, wherein frequent flier miles are able to be deducted from an account and awarded to others in a contest, game, lottery or sweepstakes. In an embodiment, an account holder may elect to donate 100 frequent flier miles back American Airlines on each toll payment, where American Airlines may elect to use the aggregated miles to conduct a sweepstakes.

Rules may be applied within the payment system to avoid toll and lottery purchases if the toll reader is located in a jurisdiction that allows toll collection only and not simultaneous lottery ticket purchase. Thus, the payment system administrator may factor the motorist's physical location into the calculus used to determine whether the lottery ticket may be purchased and associated to an account. The payment system, or an account, or the computers comprising the reciprocity network, or a combination thereof, may be configured to make a concurrent lottery-type ticket purchase if the transponder reader is located within a particular jurisdiction (i.e. a state on a list of states allowing such a purchase), but not if the transponder reader is located within another jurisdiction (i.e. a state not on a pre-approved list). For example, a transponder being read in the Commonwealth of Virginia may cause purchase of a Powerball lottery ticket, whereas a transponder read in a state not participating in the Powerball lottery would not permit that purchase to occur.

In this fashion, a state or local government may partner with a payment system operator for the purpose of operating a lottery-type game of chance in conjunction with toll collection. Transponder interoperability objectives may also be met. For example, the gameplay authority known as Virginia Lottery and, separately, the Virginia Department of Transportation, may jointly partner with the popular multi-jurisdiction POWERBALL lottery, allowing a toll collection and a lottery ticket purchase to occur nearly simultaneously, all by using a transponder in an ETC system, such as a transponder configured to function in the EZ-Pass brand system.

Other safeguards for the public may be employed to prevent abuses and undesired consequences often associated with games, contests, and lotteries. For example, the number of lottery tickets purchased in a given time period may be limited. This is in contrast to cash-based lotteries that do not often limit the number of tickets that may be purchased, sometimes leading to gaming addiction and/or facilitating compulsive purchasing habits by those who may not be able to afford them. Controlled gaming with concurrent toll collection may be a safer alternative to cash-based games, contests, and lotteries.

Other benefits exist over cash-based lotteries, including: convenience; reduced potential for adverse gambling or gambling addiction, since large sums of money cannot be used solely for bulk lottery ticket purchases; and increased user base, in that it is likely that more people pay tolls daily with electronic toll collection devices than would be willing to pay cash for a lottery ticket at an approved physical kiosk, say in the popular POWERBALL lottery at $2.00 per ticket or the MEGAMILLIONS lottery at $1.00 per ticket.

In this manner of use of the toll and payment system, government entities may raise more revenue, since traffic-based lottery jackpots may raise to higher levels than the typical lottery jackpots which require a ticket to be purchased in cash using special terminals constructed specifically to distribute lottery tickets. Rather, the convenience, security, accountability, ability to audit, efficiency, and reliability of the toll and payment system itself has the potential to maximize the number of willing participants while decreasing long felt inefficiencies of present systems. These inefficiencies include, among others, potential for theft or loss of tickets and cash, limited ability to attract players on a regular and recurring basis, limited sale locations in contrast to the broad installed base of toll collecting locations serving millions of vehicles transiting the location regularly, inability to locate holders of winning tickets resulting in lost awards, inability to capture demographic data about players, high administrative costs, potential for fraud and theft, delay in aggregating cash submitted to state lotteries, need to maintain equipment, terminals, and train staff to operate it, difficulty with ownership issues regarding a paper lottery ticket as a bearer instrument for example when multiple people pool money to buy a number of tickets ostensibly through one agent to split the winnings should any one ticket win, and so on.

Exemplary Lottery Structures

Using the POWERBALL brand lottery as a model to structure an exemplary lottery: a match of all 5 numbers, plus the Powerball, pays the jackpot amount at odds of 1/175,223,510; a match of 5 numbers pays $1,000,000 at odds of 1/5,153,632.65; a match of 4 numbers plus the Powerball pays $10,000 at odds of 1/648,975.96; a match of 4 numbers pays $100 at odds of 1/19,087.53; a match of 3 numbers plus the Powerball pays $100 at odds of 12,244.83; a match of 3 numbers pays $7 at odds of 1/360.14; a match of 2 numbers plus the Powerball pays $7 at odds of 1/706.43; a match of one number plus the Powerball pays $4 at odds of 1/110.81; and a match of the Powerball alone pays $4 at odds of 1/55.41.

Using the MEGAMILLIONS brand lottery as a model to structure the lottery, five balls are drawn from a set of balls numbered 1 through 75; one ball is drawn from a set of balls numbered 1 through 15, the "MB". A player wins if the numbers on one row of the electronic lottery ticket match the numbers of the balls drawn on that date. There are nine ways to win a prize, from $1 to the jackpot. If no one wins the jackpot, the money is added to the jackpot for the next drawing. Overall chances of winning a prize are 1 in 15.

In this example, a win occurs thusly: a match of all 5 numbers, plus the MB numbered 1-15, pays the jackpot award, at odds of 1/258,890,850; a match of 5 numbers pays $1,000,000 at odds of 1/18,492,204; a match of 4 numbers plus the MB pays $5,000 at odds of 1/739,688; a match of 4 numbers pays $500 at odds of 1/52,835; a match of 3 numbers plus the MB pays $50 at odds of 10,720; a match of 3 numbers pays $5 at odds of 1/766; a match of 2 numbers plus the MB pays $5 at odds of 1/473; a match of one number plus the MB pays $2 at odds of 1/56; and a match of the MB pays $1 at odds of 1/21.

Drawings and drawing results may be made public. The odds of winning a prize are 1/31.85 in the POWERBALL model, and overall chances of winning any prize in the MEGAMILLIONS model are 1/14.7. Using either model, or a combination, given the number of vehicles that pass at least one toll daily, the prize odds would result in a significant number of motorists winning on a daily basis, and would alleviate to some degree the negative public perception often associated with paying tolls.

In another exemplary contest or lottery, each instance of a transponder being read by a reader creates for the account holder an electronic transaction receipt, or lottery-type-ticket, comprising five non-repeating numbers, between 1-60, and one special identifier between 1-60, each number being selected by random number generator. Each electronically issued lottery-type-ticket is linked to the account associated with the transponder.

Regarding the length of the contest, game or lottery, by way of example, a lottery drawing may be held once weekly. At a preselected time each week, say 10:00 PM each Friday, the payment system administrator, by random number selection process, identifies five non-repeating numbers, between 1-60, and one special identifier between 1-60. The jackpot, or aggregate money pool, is paid to the account containing an electronic transaction receipt (or lottery-type-ticket) for that week that matches the selected numbers. If more than one electronic transaction receipt for that week matches the selected numbers, the aggregate money pool is split accordingly. If no transaction receipt matches the selected numbers, the aggregate money pool jackpot, or a portion thereof, rolls over to the succeeding week.

The system operator may determine awards other than the jackpot award, which requires matching all five numbers, plus the special identifier. Fewer matched number combinations may comprise winning entries, with the amount of award generally being commensurate with the odds of winning. As one of ordinary skill in the art of lotteries and statistics would appreciate, the POWERBALL or MEGAMILLIONS lottery models are suitable for use. Those skilled in statistics and lotteries would also appreciate and apply differing methods of altering the odds of winning, altering the likely jackpot and payout amounts, altering the number of balls used in a lottery, altering the number of possible numbers for each ball, altering the time in which the lottery is conducted, and so on, and these embodiments are intended to be part of the present disclosure.

For example, the payment system operator may vary the time between lottery drawings. The lottery drawing may be held at a regular time, fixing the time period in which the game is played, for example conducting a lottery drawing every Friday at 10:00 PM EST. That is, each state's transponder-based lottery collection is pooled weekly with the collection from all other participating states, with Friday at 10:01 PM EST being the first date boundary and the following Friday at 9:59 PM EST being the second date boundary. If a transponder is read within that given time period, causing issuance of a lottery-type-ticket and payment therefore, the lottery-type-ticket is deemed to have been issued within that given time period. The gameplay payments are pooled with all similar payments made within that given time period. Each motorist having had his transponder read in the same time period (from first date boundary to second date boundary) is eligible to play the lottery game for that time period. All electronic lottery-type-tickets issued between said first date boundary and said second date boundary are eligible to win when the lottery numbers are randomly drawn. Electronic lottery-type-tickets issued outside of the time period are stale and are not eligible to win.

Alternately, "stale" tickets (e.g. those that did not win after the first random drawing) may remain eligible for a reduced jackpot in a secondary game if all numbers match for succeeding drawings, which may encourage long-term and consistent play. That is, electronic lottery tickets may be set to not expire after the first drawing but to remain active for a secondary award set for succeeding random drawings. By way of example, an award of $10,000 may be offered for any electronic ticket that matches all numbers drawn in any drawing. This type of "lifetime jackpot" opportunity, where a ticket once purchased always remains active, albeit for a lesser award or jackpot, may provide incentive to consistently enroll in gameplay. The system administrator may set account settings to discard past electronic lottery ticket numbers if, for example, an account's funding source fails to maintain the account with a predetermined account balance, providing further incentive to maintain a funded account. Moreover, this type of "lifetime jackpot" lottery is virtually impossible with bearer-based paper lottery ticket lotteries, since it would be exceedingly cumbersome to store number combinations on paper tickets and compare them against every set of numbers drawn in every succeeding drawing, whereas the payment system described, where electronic lottery tickets are stored and associated to an account in a computer or network of computers, makes long-term play possible. Other time periods may be used, for example, allowing any electronic lottery ticket to remain active for the secondary prize for a period of a year or two years but not indefinitely.

The longer the time period between the first date boundary and the second date boundary, the more likely it is that the number of vehicles paying a toll and buying a lottery-type-ticket will rise. If the time period is short, for example on the order of a day or less, it is likely that the number of transactions will be less than if the time period is longer, for example on the order of a week or a month. The payment system administrator may set, or vary periodically, the time period. For example, a trigger may be set to close the time period once the aggregate gameplay money pool reaches a predetermined size threshold. The time period may also be set to encourage users of the payment system to travel toll roads or toll lanes during specific times, for example during rush hour, whereas gameplay tickets may not be available during non-peak travel hours (or vice-versa). That is, a lottery time period may run for only a few hours, say 6:00 AM to 9:30 AM and again from 3:30 PM to 6:30 PM for each time zone in the United States, with the lottery drawing being held daily after 6:30 PM in the last participating time zone.

The payment system operator may also vary the frequency of the raffle drawing or lottery drawing, as well as the percent of proceeds collected that may be distributed as an award.

Raffles and Aggregate Money Pools

Certain embodiments have been described which encompass participation in existing lotteries, such as the MEGAMILLIONS and POWERBALL brand lotteries, or which adopt models using the same statistical models and gameplay rules. These lotteries typically charge $1.00 or $2.00 to play, and the motorist using the present toll and lottery payment system may simply be added to the overall population of players having tickets purchased with cash. Because the daily vehicle toll-paying population is large, it represents a likely increase in the number of players. A large population participating in a toll and gaming payment system will likely result in 1) larger payouts to the players (as large jackpots tend to increase the number of players), 2) more players that play consistently, since certain vehicle traffic is regular and predictable, for example commuter traffic traveling a set path each weekday, 3) more revenue for gameplay authorities, such as state lottery authorities, and 4) better gaming experiences, since gameplay authorities will have access to certain customer demographic data previously unavailable in cash-based lotteries and can use it to tailor games to the players.

In another embodiment, lotteries or raffles can be offered that are limited to tickets purchased via the transponder/toll collection population. For example, the Commonwealth of Virginia may hold its own raffle or lottery for those motorists that pay a toll in Virginia. While the jackpots may not reach the size of national lotteries, some users may prefer them. As an example, the Virginia Lottery may add $0.25 to each toll as a voluntary lottery participation opportunity, a portion of which is returned to the pool of motorists as a raffle or lottery jackpot, wherein all vehicles that transit a toll reader in Virginia during the preceding week are eligible each Friday to win the jackpot.

Further, "micro-lotteries" can be conducted, since collection of the fee to participate is done electronically from a pre-funded account, making collection of unusual amounts, say $0.33, a simple matter, whereas a cash or coin based lottery collection of the same amount would be more problematic. For instance, a system operator may make several non-exclusive lottery participation options available in a user's account settings. The Commonwealth of Virginia may offer a $0.25 "instant-win" virtual scratch-off lottery-ticket-type game, a $0.35 Virginia-toll-only lottery, a $1.00 MEGAMILLIONS electronic lottery ticket, and a $2.00 POWERBALL electronic lottery ticket. Depending on the account holder's account settings, the account holder may elect to play all games at once, or any combination thereof. In this example, where each available game is selected, the motorist pays the toll plus an additional $3.65 each time his transponder is read.

FIG. 2 shows an exemplary account settings screen that may be accessed using a web browser and Internet connection (or a facsimile thereof by use of a mobile computing device such as a mobile phone or tablet computer). Here, the account owner is provided a palette of lotteries supported by the payment system operator. Here, there are five available lotteries shown, and the user has checked a check box indicating his intent to play each game or lottery when his transponder is read. The user has elected to play: "Powerball" lottery for $2, "Megamillions" lottery for $1, "VALottery" for $0.50, "USA-Roads" game for $0.25, and "Super-Spin" for $0.25. The user also has the option to select "None" as the LotteryType, but he has left that box unchecked because he wants to play each of the five participating lotteries. Playing one ticket for each available lottery option carries a total cost of $4.00.

The account settings may also allow the user to select a quantity of each type of ticket, optionally limited in number by the system administrator, for example limiting the quantity to four for any single type of lottery ticket. As shown in FIG. 2, the account holder has elected to buy one Powerball ticket, as indicated by "1×"; two Megamillions tickets as indicated by "2×"; one VA Lottery ticket; one ticket for the "USA-Roads" game; and four tickets for the game "Super-Spin". Here, the user's selections cost $5.75, which is debited from the account and paid to the proper gameplay authority or authorities.

In another embodiment, a raffle is held once per week. The raffle entries comprise the account number for each vehicle whose transponder is read by a reader within the given time period. For example, if a first vehicle pays a toll ten times a week, his account number is entered into the raffle ten times. If a second vehicle pays a toll once in that week, his account number is entered into the raffle once, and so on. At the end of the week, a blind drawing is held, and one account number is drawn to win the prize pool. Other raffles may be held, for example one that awards 70% of the proceeds to the first account number drawn, 20% to the second account number drawn, and 10% to the third account number drawn. Yet other raffles may be held, for example one that awards 60% of the proceeds to the first account number drawn, 20% to the second account number drawn, and the remaining 20% split among the next X number of account numbers drawn, wherein X is a variable set by the system administrator to maximize participation. For instance, X may be the next 1000 account numbers selected, to ensure there are at least 1000 winners for each raffle. Those of skill in the art would appreciate there are different raffle embodiments that may be used, and those embodiments are intended to be within the scope of the present disclosure.

Quick Feedback Games and Contests

While lotteries may attract some users, others may prefer a game in which they know whether they have won almost immediately. In one embodiment, the transponder may function to act as a mobile gaming system component that initiates the virtual spin of a virtual slot machine, wherein the passing of a toll transponder reader causes a virtual slot machine play on a hosting computer operated by a gameplay authority. Another example is a scratch-off-type lottery ticket, where the user is electronically presented a facsimile of a paper scratch-off lottery ticket, where a section may be scratched off to determine instantly whether the ticket is a winning ticket.

In application, the transponder is read by a transponder reader. The transponder reader communicates with a computer or network of computers to store information read from the transponder. A computer or network of computers finds the account associated with the transponder, for example by searching a database comprising transponder identification numbers and one associated account for each. A computer or network of computers identifies the account settings associated with the account, operates to apply the rules specified in the account settings, and if the account settings show the preference of the account holder to engage in the gameplay, the gameplay is initiated and the fee therefore is debited from the account and paid to the gameplay system operator. A computer or network of computers conducts the gameplay, for example conducting by random number generator a game such as a virtual slot machine spin.

The result of the gameplay, e.g. the result of the virtual slot machine spin, is preferably communicated to the transponder (or hardware/software in communication with the transponder) before the vehicle containing the transponder leaves the communication range of the transponder reader. More than one transponder reader can be positioned to communicate the result of the gameplay back to the motorist, for example to provide feedback to the transponder before the vehicle has advanced beyond the area of the toll booth or toll collecting location. In this manner, the payment and gaming system may deliver in near real-time the result of the virtual slot machine spin back to the transponder (or a device communicating with the transponder), which then gives the vehicle occupants audio, video, or audio-video feedback. The process of dramatizing a win by playing sounds, for example while a meter counts up to the amount that has been won, is sometimes referred to as rollup.

The payment and gaming system may authorize the debit of an account for the cost of a virtual slot machine spin. The actual debit of the account need not necessarily occur for game play to be authorized, for example if transponder data is read and transferred to a central computer or network of computers only once daily for the actual debiting of accounts. The operation of pre-funding accounts, and automatically replenishing accounts with low balances from a funding source, ensures an authorization of game play should always, or almost always, occur when the account holder so desires. That is, a gameplay may always be authorized, but winnings would be disallowed if for any reason the account contained insufficient funds to pay for the gameplay. This also encourages maintenance of account balances, ensuring adequate funding and valid funding sources.

Alternately, the transponder passing and being read by a reader may initiate a gameplay even if the account holder has elected not to participate, and the feedback may be provided to the transponder or account showing what the account holder would have won had he been playing. If a virtual slot machine spin win is communicated to a transponder, or hardware and/or software in communication with the transponder, when the motorist has elected not to play, for instance, the positive feedback of a win may entice the account holder to begin playing the game in the future to actually realize the winnings.

Assuming the account holder has elected not to play any game, the gameplay authority may still display and operate the user's account as if the user was paying to play, showing how his gaming history would have occurred. For some, this may provide incentive to play.

As shown in FIG. 1, the account settings may display the amount of gameplay winnings that the account holder would have won, including cumulatively, for example by a message similar to, "You should play the Game! You would have won a total of $10,450 if you had been playing SlotCar alone!" FIG. 1 shows an account settings screen, with the account holder electing in "Game Selections" the entry "none", meaning he is using his transponder and account to pay tolls only, and not to play a game.

The transponder, or a hardware device comprising the transponder, or hardware in communication with the transponder, may comprise a video screen and/or a speaker to provide audio or video information to the motorist. If the virtual spin results in a win, the award may be deposited into the account associated with the transponder (or to the funding source), and the event of the win may be preferably communicated back to the transponder, or a hardware device comprising the transponder, or hardware in communication with the transponder, to notify the motorist via audio-video feedback. An exemplary notification is an audible spoken announcement of the amount of money won, or a tone, tune, jingle, or song to indicate a win. Audio feedback may serve to prevent driver distraction as vehicles merge after a tollbooth, as opposed to audio-video feedback.

A light may also be configured to blink or flash to show oncoming motorists a win has occurred, with the objective being to demonstrate a high number of wins occurring, which is intended as an enticement for others to play. For example, the transponder, or a hardware device comprising the transponder, may comprise a small colored LED light that flashes for 5 seconds after a win. Oncoming traffic, for example traffic slowing for a tollbooth in lanes traveling in the other direction, may notice an unobtrusive small flashing purple light, which indicates a win, has occurred. The objective is to keep motorists interested and enrolled in the gaming and payment system, and seeing others win helps meet that objective.

The account holder may also be notified of a win by other means, for example by phone message, by email, by text-message, by tweet (using the Twitter brand messaging service), by social network message, by reference to account settings panels, or similar. Preferably, the event of a win, in this embodiment, is communicated to the motorist within a minute or less from the time at which the transponder was read by the transponder reader, and optimally within 5-10 seconds or less.

In another embodiment, a representation of a virtual slot machine spin, or any game result, may be displayed on a screen in a vehicle, for example on a vehicle's instrumentation panel, on a heads-up display (or a holographic display in any mirror, window, or windshield), or on a navigation system screen. For example, a transponder, or a hardware device comprising the transponder, may be configured to be in communication with a vehicle's instrumentation panel or navigation system screen. When a transponder encounters a transponder reader, the transponder, or a hardware device comprising the transponder, causes the navigation system screen to temporarily display a virtual slot machine spin, as one may see on a video slot machine at a casino, as well as optional summary data concerning the toll cost and gameplay cost. Preferably, the audio-visual display lasts for a short duration to show that the game has been played, and the instrumentation panel or navigation system screen returns its ordinary display functions as the vehicle leaves the transponder reading location or as the vehicle reaches a threshold speed. Without causing undue driver distraction, the excitement of playing a transponder-based game is fostered by a brief display of audio-visual media.

FIG. 4 shows a vehicle navigation system screen 1 displaying a map of Tyler, Tex., and vehicle systems summary data, here a time of day, date, and active radio station with call letters; a transponder and reader causing temporary usage of the screen to display toll and game related data in screen 2 at time arrow 3, that being the time immediately after the transponder reader reads the transponder; and a return to displaying a map and vehicle systems summary data when the vehicle leaves the vicinity of the transponder reader or reaches a threshold speed, represented by time arrow 4.

Figure 5:
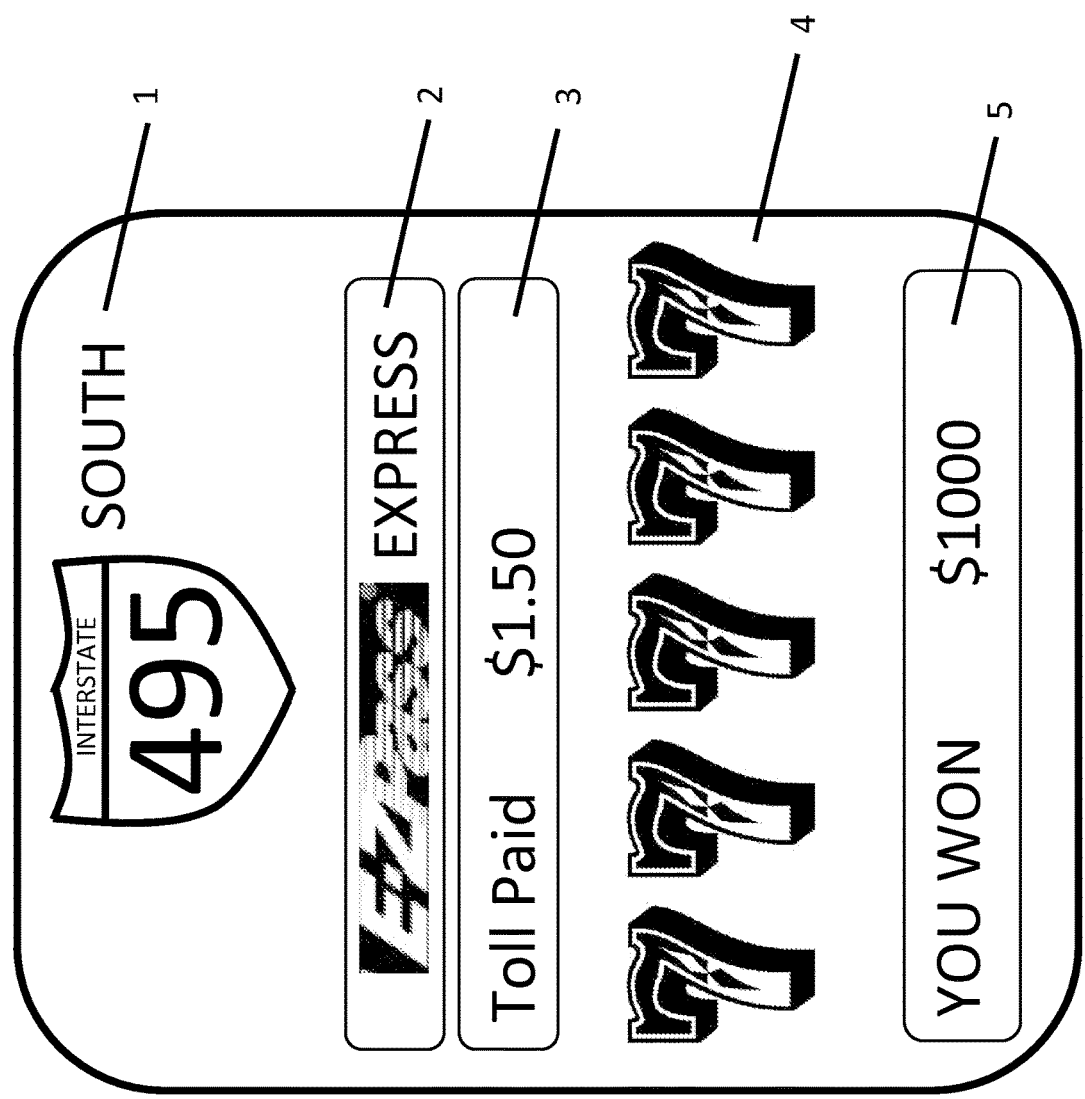
FIG. 5 illustrates a navigation screen in a vehicle displaying the result of a game played as part of a payment system.

FIG. 5 illustrates a vehicle navigation screen showing toll and gameplay information. Road indicator 1 shows a graphic to indicate the vehicle just paid a toll on southbound Interstate-495. ETC system indicator 2 shows that the toll system is part of the system branded "E-ZPASS EXPRESS" and that the account associated with that transponder will be debited. Toll charge indicator 3 shows the amount of the toll paid, here being $1.50. Game indicator 4 shows a virtual slot-machine-type game showing a game with five virtual spinning reels. Each reel is shown here in its final position showing a stylized numeral "7", a symbol typically found on casino slot machines and here shown as part of a virtual spin of a virtual slot machine. This representation of the result of the virtual slot machine spin would indicate a winning spin, since all five of the symbols are matching on the one horizontal pay line shown. Winnings window 5 shows that this virtual slot machine spin has won $1000.

The virtual slot-machine-type game usually involves matching symbols, here on simulated mechanical reels represented on a screen that appear to spin and stop to reveal one or several symbols. The symbols are usually brightly colored and easily recognizable, such as images of fruits, numerals or letters; simple shapes such as bells, diamonds, hearts; playing cards to simulate video poker; or even animated cartoon characters or images of popular actors or singers. Exemplary embodiments comprise virtual video slot machine-type play with 1, 3, 5, 9, 15, 25, or as many as 243 different pay lines. The amount wagered may be determined by the user in the account settings, and higher wagers may provide higher payouts for winning combinations than wagers of lower amount.

In an embodiment, the gaming authority operates a computer or network of computers comprising one or more random number generators to facilitate gameplay. When a transponder is read by a transponder reader, the computer or network of computers operated by the gaming authority initiates a virtual spin of the virtual slot machine, and associates that virtual spin to the account corresponding to the transponder. Because all gameplay occurs on a computer or network of computers operated by the gaming authority, as opposed to on firmware on a multitude of distributed slot machine devices, as would be found in a casino, legal and regulatory compliance and ability to audit the gaming and payment system is made easier.

In FIG. 5, winnings window 5 shows that this virtual slot machine spin has won $1000. If a player matches a combination according to the rules of the game, the account (or the funding source itself) may be credited with the prize amount corresponding to the type of winning combination.

In an embodiment, the result of the gameplay is communicated to the transponder, to a vehicle instrument panel, or to any embodiment of a screen in the vehicle, such as a navigation screen or a display on the transponder itself, as was shown in FIG. 4. Preferably, the simulated gameplay limits driver distraction, for example showing the gameplay for a duration of 5 seconds or less or by removing the visual gameplay display after the vehicle passes a speed threshold, for example 25 MPH, or a physical marker. This may even encourage drivers to exit toll plaza lanes at slower speeds, rather than accelerating rapidly after a tollbooth, and may result in safer merge areas and driving conditions. Other embodiments, for example when transponders are read at highway speeds, as with the exemplary HOT/HOV lanes, may employ only audible gameplay notices, for example providing audible "rollup" as the process of dramatizing a win by playing sounds while the meters count up to the amount that has been won. In yet another embodiment, the reading of a transponder may accrue for the account a gameplay credit, which the motorist may use to initiate gameplay, or to view a gameplay result, in a non-moving environment, for example once the car is parked. This maximizes road safety, while also providing the excitement of a game with near instantaneous feedback.

In an embodiment, each virtual spin is associated to an account. The gameplay authority may store this spin history and make it available to a user. A user may view, on his computer or mobile phone, his account and spin history to "rewind" any spin and to watch it occur again. This may provide added excitement for some users, for example if a spin produced a significant win or if a spin created the appearance of a near-win of a significant win, for example where a jackpot may have not been won but for only one symbol being outside a pay line, or by one virtual playing card being out of sequence for a winning virtual poker hand. The feeling of a near-win, and the ability to recreate it, may entice some users to continue participation in the game.

Those of skill in the art of gaming would know to employ different types of virtual slot-machine-type games, for example employing differing numbers of virtual reels, differing numbers of symbols, differing weights or probabilities to be accorded to particular symbols, differing the number of symbols per virtual reel, differing winning combinations, differing rows of reels, differing number of pay lines, differing payout amounts, differing the payment amount as a function of all money wagered or adjusting the theoretical payout percentage, differing the availability of a progressive jackpot, differing odds of winning, differing elements of gameplay for example for regulatory or legal compliance or classification, and so on, all of which are intended to be within the scope of the present disclosure. For example, an embodiment may be provided comprising at least one virtual reel that has 256 virtual stops per reel and would allow up to $256^3=16,777,216$ final positions. The gaming authority may choose to offer a $1 million jackpot from a $1 bet, confident that it will only happen approximately every 16.7 million plays.

This virtual slot machine-type game may provide near instantaneous indication of a win, and some motorists may find this game attribute more attractive than a game like a lottery that requires a wait until a winner or winners are determined.

Those skilled in the gaming industry appreciate the multitude of types of virtual slot machine-type games, and other games, that may be deployed, including those that have jackpots that roll-over or compound over time until a single player wins the jackpot. It is intended that any suitable game types may be deployed in conjunction with a toll transponder and the other features described herein, wherein the transponder, associated to an account and account settings, provides a quick, simple, convenient way to initiate game play from a vehicle.

Mileage Based Tolls and Gameplay

In another embodiment, the transponder functions to collect tolls based upon distance traveled, rather than a toll being collected upon one-time passage of a transponder reader, for example at a discrete toll plaza. For example, transponder readers may be placed periodically on interstate highways, with the distance traveled between transponder readers being used to compute a toll at a predetermined toll rate. If a vehicle travels from Washington, D.C., to Orlando, Fla. on Interstate-95, transponders may be placed periodically, for example in 5 to 10 mile increments, at exits, or at overpasses to log passing transponders. A first transponder reader may read a transponder at an overpass in Northern Virginia, comprising exemplary "mile=0". A second transponder reader may read the transponder on the interstate 10 miles south of the first transponder reader, and the computer network may log the fact that the vehicle traveled 10 miles, for example by capturing the time and date when a transponder was read. The transponder reader network may continue capturing data, which is sent to a toll authority computer or network of computers (e.g. the reciprocity network) for the purpose of calculating cumulative distance traveled. A toll authority, for example a state government agency, may then apply a tax rate to the number of miles traveled, for example at a rate of a $0.50 toll for every 100 miles traveled on an interstate.

The account holder may elect in his account settings to electronically purchase a game, contest, lottery, or sweepstakes entry each time the toll is applied using the mileage-based toll. Transponder embodiments in this example comprise vehicle-mounted passive RFID transponders; hardware and software used in global navigation satellite system (GNSS) or Cellular (GPS-type) systems; V2V systems; or other suitable transponders.

While some mileage-based toll collecting systems may be associated with privacy intrusions and interference with the unmolested freedom of travel on public roadways, certain embodiments of the payment system do not facilitate long-term storage of location data and facilitate voluntary participation. Preferably, the location of a transponder having been read is maintained only so long as necessary for the account holder to confirm accuracy of debits made to the account, and not for government tracking of travel habits or other privacy intrusions. Either the system may be configured to securely delete location data after a given period of time, or the account holder may be provided the facility to securely delete his own travel location data. In any case, the mileage-based toll system is more likely to see widespread public acceptance if offset by positive features, such as the provision of awards to the user base, as described in the foregoing optional gaming, contest, and lottery features. Voluntary participation is preferable to forced taxation. If the odds of winning are high, or conversely, if the odds of winning are low but the jackpot amount available is high, there may be greater acceptance of mileage-based toll collection systems, with associated games, contests and lotteries.

In another embodiment, the purchase of a lottery-type ticket (or similar) may be tied to the distance a vehicle has traveled, apart from the periodicity in which a toll is applied. For example, the user may instruct, in an account settings console, that a lottery ticket be purchased once for every x miles miles traveled (e.g. 100 miles), as measured by a transponder and transponder reader/communication system. The account holder may set the distance-traveled variable that causes the lottery-type ticket purchase(s). One exemplary transponder system comprises a GPS-based device, such as the device using the brand name "METRONOME", used by MetroMile, Inc. and MetroMile Insurance Services, LLC, San Francisco, Calif., to operate an insurance-by-the-mile service. This exemplary transponder connects to a vehicle's OBD-II port, and wirelessly communicates certain vehicle data, such as mileage data and/or location data, via wireless service to a computer or network of computers.

Further, if the transponder provides vehicle location data, as would be the case for a GPS-type transponder reporting wirelessly to a computer or network of computers, the user may specify in account settings which roads should be used to accrue mileage totals and which roads do not. For example, the user may opt to log only highway or interstate miles, and not miles traveled on other roads.

If, for instance, a motorist has a travel pattern of about 225 interstate miles every week commuting to work, he may determine that it is more convenient to purchase electronic lottery tickets based on mileage rather than by standing in a queue to buy a lottery ticket in cash. The motorist may replace a habit of buying 2 lottery tickets per week in cash with a more convenient method of regularly participating electronically in a lottery by instructing his account to be debited once for every 100 miles traveled. The mileage-based contest, game, or lottery participation may be combined with the mileage-based vehicle insurance service using the same transponder and communication equipment.

Transponder Use to Affect Traffic Patterns

What is disclosed here is another way to affect the flow of traffic by providing the option of traveling in toll lanes, but with the potential to participate in a lottery, game or contest at the same time by virtue of use of a transponder and associated account with account settings.

Figure 6:
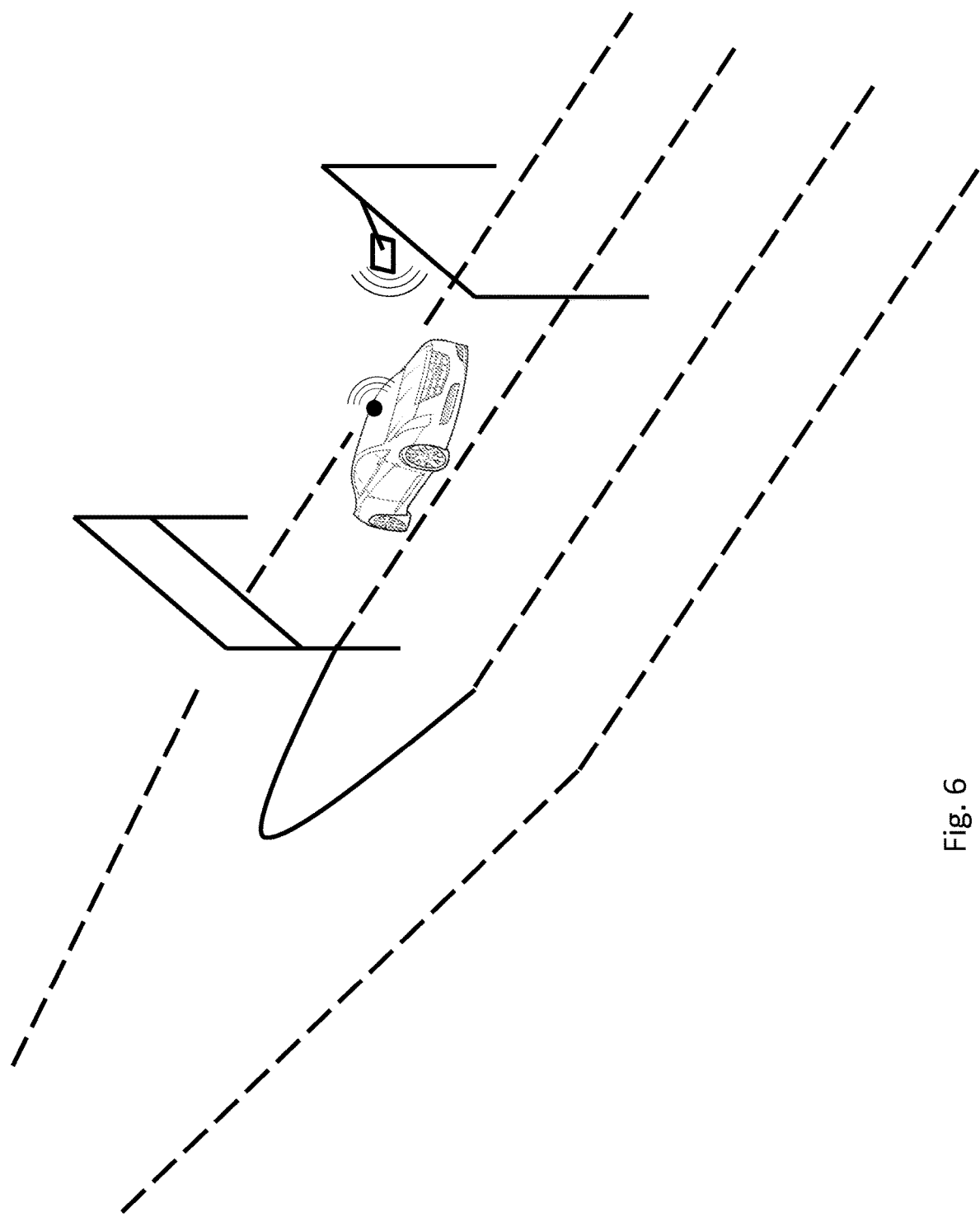
FIG. 6 illustrates a road with a lane having a transponder reader for an electronic toll collection and payment system.

For example, as illustrated in FIG. 6, on Interstate 495 in Virginia, there exists a stretch of toll road with lanes parallel to the interstate, where the toll lanes are intended to provide a quicker route to a destination. Depending on time of day and traffic volume, the toll system operator may vary the fees to travel the toll lanes. (In this example the Virginia Department of Transportation (VDOT) is the exemplary toll system operator, or toll-collecting authority, having a concession agreement that allows Transurban (USA) Operations Inc. to operate the lanes known as the "495 Express Lanes" or the HOT lanes.) These toll charges are advertised to the motorist by overhead road signage so he may determine, at the time, whether the time savings of traveling the toll road are worth the nominal cost of traveling the toll road versus remaining on the standard interstate. The toll road operator may vary the toll fees to affect the flow of traffic, providing an incentive, or disincentive, for the motorist to travel in a particular set of lanes.

These I-495 HOT ("high occupancy toll") lanes in Virginia support certain exemplary transponders, which can let the driver switch between HOV and toll-paying modes. An example is the "E-ZPass FLEX" transponder contrasted to a standard "E-ZPass" brand transponder. When a transponder is switched to HOV mode (with three or more passengers in the vehicle), it is read by the HOV lane's toll equipment but no toll is charged. In one embodiment of the present payment system, the user may operate another feature, namely switching the transponder to pay a toll and to make a nearly simultaneous purchase of a lottery ticket, or in the case of HOT lanes to make a lottery ticket purchase only.

Figure 7:
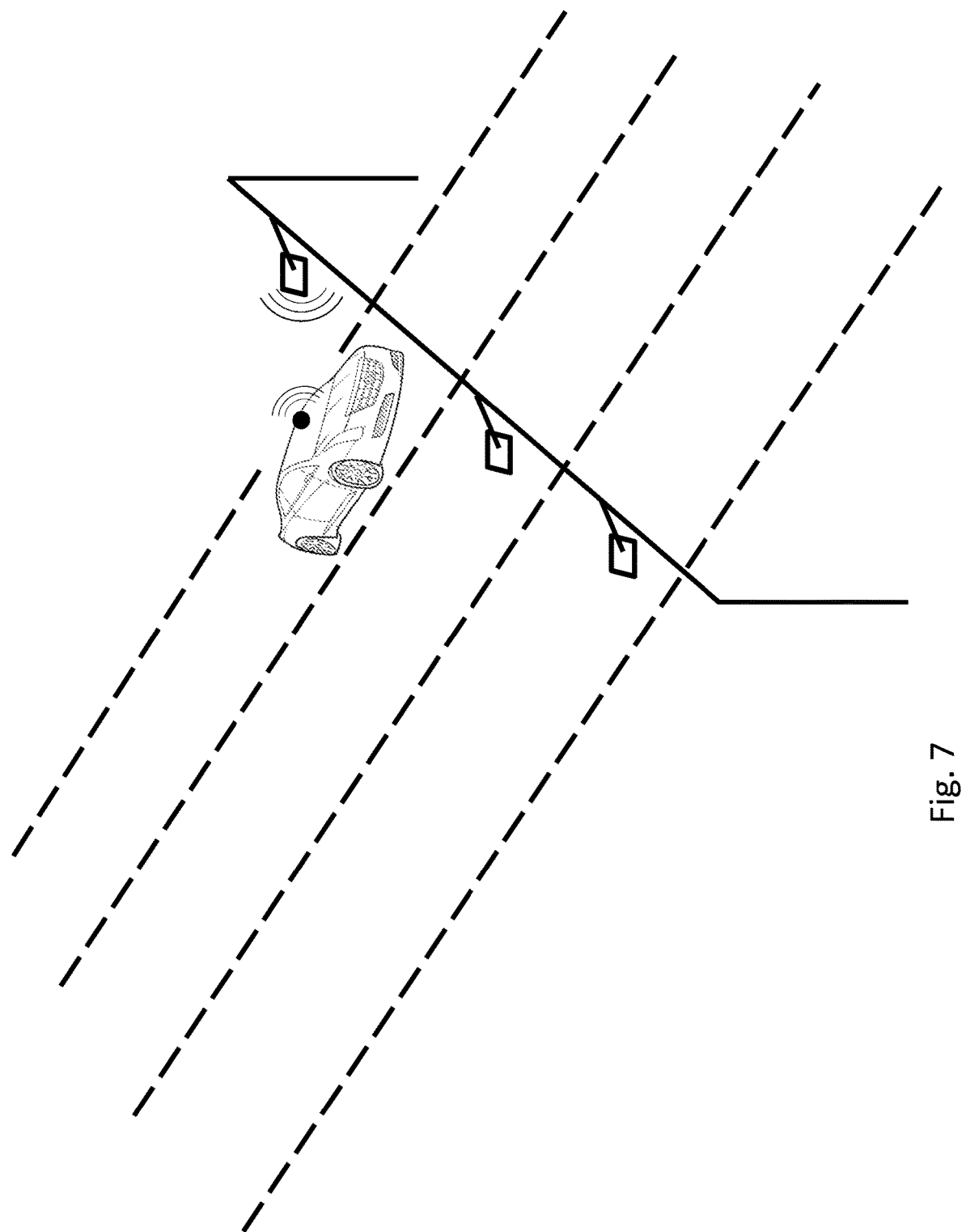
FIG. 7 illustrates a road with a multiplicity of lanes, wherein transponder readers are deployed in the lanes to distribute traffic flow.

In another embodiment, FIG. 7 illustrates a road with a multiplicity of lanes, wherein a transponder reader is deployed in each lane. To distribute traffic flow, a toll collecting authority or a gaming authority may alter the toll by lane, or the game, contest or lottery offered by lane. For example, transponder readers may be placed periodically along a heavily traveled road, as illustrated in FIG. 7 as an overhead antenna array. Assume for instance, an accident has occurred in the rightmost travel lane, and the blockage has become known to the police, or other authority such as a department of transportation, state police, or traffic-camera monitoring center. Traffic can be encouraged to merge into the leftmost travel lanes well in advance of the blockage if the motorists are provided incentives to do so, for example by way of availability of games, contests and lotteries in certain lanes but not in others. By providing possibility for reward, affirmative behavioral modification is applied to the aggregate motorist population, positively reducing congestion by voluntary action by each motorist. Alternately, additional fines or tolls may be assessed for travel in certain other lanes, for example in blocked lanes at a point near the blockage or merge area. In this instance, portable transponder readers, for example those that may be mounted on large orange traffic cones, can meter tolls or fines to those vehicles that merge extremely late, causing even slower merge patterns and dangerous merge conditions.

For instance, for every vehicle that merges early in advance of a blockage, the account holder may be entered into a contest or raffle to win a reward, such as money or free or reduced price toll passage in the future. That is, the transponder reader above the lane or lanes in which travel is desired, the "active lane(s)", will function to read the transponder in that lane and effect the transaction with the account, e.g. providing to the account a raffle-type ticket, or referencing the account settings to determine whether a purchased entry to a contest, game or lottery is desired. FIG. 7 shows the leftmost travel lane being an active lane with a transponder reader reading a transponder, while the middle lane and the rightmost travel lane are non-active lanes where the transponder readers there are not activated. Again, portable transponder readers can be deployed in emergencies, so the police can erect, temporarily, an "early merge" zone, where voluntary participants are rewarded. Transponder readers in non-active lanes can be configured either to not read passing transponders, or to log passing transponders but to take no further action.

Advertising the Benefit of the Payment System

The payment system operator may advertise the existence of the lottery games and the jackpot amounts, for example in signage preceding a tollbooth or at the entry of a toll road. Exemplary signage includes the name of at least one lottery, the jackpot amount, and an electronic display that may be changed remotely to periodically update the jackpot or payout amount. Advertisement of the dollar amount of the aggregate money pool may encourage use of toll lanes and may entice individuals who would otherwise pay tolls in cash to open electronic toll collection accounts, further reducing the cost of personnel to operate standard cash-based toll collection booths. Further, as would be the case in the exemplary "495 Express Lanes" in Northern Virginia, signage may provide enticement for traffic to opt enter one set of toll lanes, as opposed to traveling a parallel set of non-toll lanes, spreading traffic volume and reducing traffic congestion.

In addition, signage may be present at toll roads, bridges, tunnels, waterway crossings, and border locations, such as border checkpoints for traffic bound for the United States. As an added benefit, more motorists crossing borders would be more likely to install transponders if they feel they are able to win prizes and awards by doing so and participating in the transponder and account payment based system. By utilizing the payment system described, United States government officials have another way to monitor vehicle traffic at borders in addition to using cameras to read license plates, in that motorists will voluntarily adopt transponder based payments.

Figure 8:
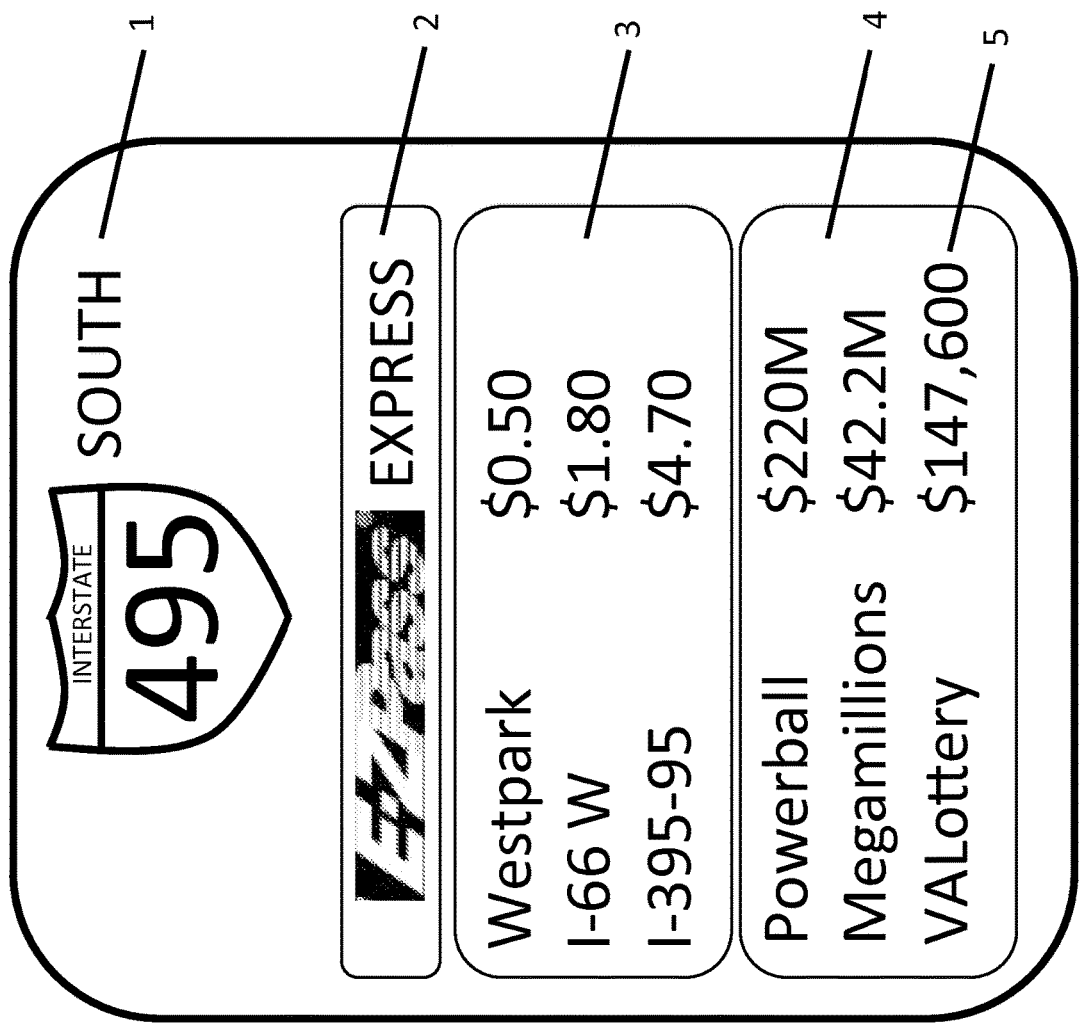
FIG. 8 illustrates digital signage for a payment system comprising electronic toll collection.

FIG. 8 illustrates electronic road signage that may be placed on a toll road. Shown is a road sign with a road indicator 1, here showing signage for southbound lanes on Interstate-495; toll signage 2, here showing the toll road accepts certain transponders, shown as "E-ZPass Express," as part of the "E-ZPass" electronic toll collecting system; toll destination electronic signage 3, here shown as a digital display showing three exit options, and the toll cost at that time to exit the toll road at a certain exit, those being Westpark exit for $0.50, I-66 Westbound exit for $1.80, and the I-395-95 interchange exit for $4.70; and lottery electronic signage 4, showing three lottery options and the current jackpots for each. Illustrated is advertisement for the POWERBALL jackpot of $220M, the MEGAMILLIONS jackpot for $42.2M, and the VALottery jackpot for $147,600. The toll destination electronic signage 3 is shown with three exit destinations, but since the signage is electronic, the entries in each row can be changed periodically to update prices or to show pricing information for more than 3 exits. For example, information for the first 3 exits displays for 5 seconds, then information for the next 3 exits is displayed for 5 seconds, and so on. The lottery electronic signage 4 is also electronic signage that can be changed periodically, preferably as controlled by a remote computer. For example, the POWERBALL lottery jackpot may be updated twice weekly and the MEGAMILLIONS lottery jackpot may be updated twice weekly. Here, a rolling jackpot ticker 5 shows the near real-time jackpot available for the VALottery, for example adding all fees paid to play a virtual slot-machine-type game in the Commonwealth of Virginia that has a growing jackpot until someone wins.

FIG. 9 illustrates an exemplary internet-accessible account settings screen. Shown, in part, is the Transponder-ID-Number; the Account Number, and all Transponder-ID-Numbers that may be associated with the account; user information, including for example name, address, phone number, driver's license number, date of birth, email address, Social Security number, vehicle information (make, model, year, license plate number), and so on; a transaction history pane (an embodiment of which is shown in the rightmost table titled "Account Activity"); game selections, to allow the user to select the game(s), contest(s) and/or lottery or lotteries he wishes to play; transponder override selector, to allow the user to determine whether the data communication feature on the transponder itself should be allowed to override the selection made in the game selections; account funding or replenishment sources, wherein the user authorizes the system operator to periodically fund the account; gameplay number selector options, such as a lottery number matrix; and specialty settings, for example checking a selection box that corresponds to a rule that when instituted initiates purchase of an electronic lottery ticket only if a jackpot rises over a predetermined threshold amount or only once every X number of times a transponder is read.

FIG. 9 also shows an account activity history in the rightmost table, showing by week the lottery numbers played, the game (here, Powerball), the cost to play and the amount won from a particular lottery ticket, and the date and time upon which the lottery ticket was purchased. Buttons are shown in the exemplary account settings screen to access other account settings consoles.

For example, FIG. 10 shows summary data in an account settings screen regarding toll collection data for three separate transponders associated to one account. Shown by week and by transponder is the toll amount debited from the account, the date and time the transponder was read, and the location where the transponder was read. Customizable reports may be created by the user, for example to capture all transponder transactions for a predetermined time period.

Figure 11:
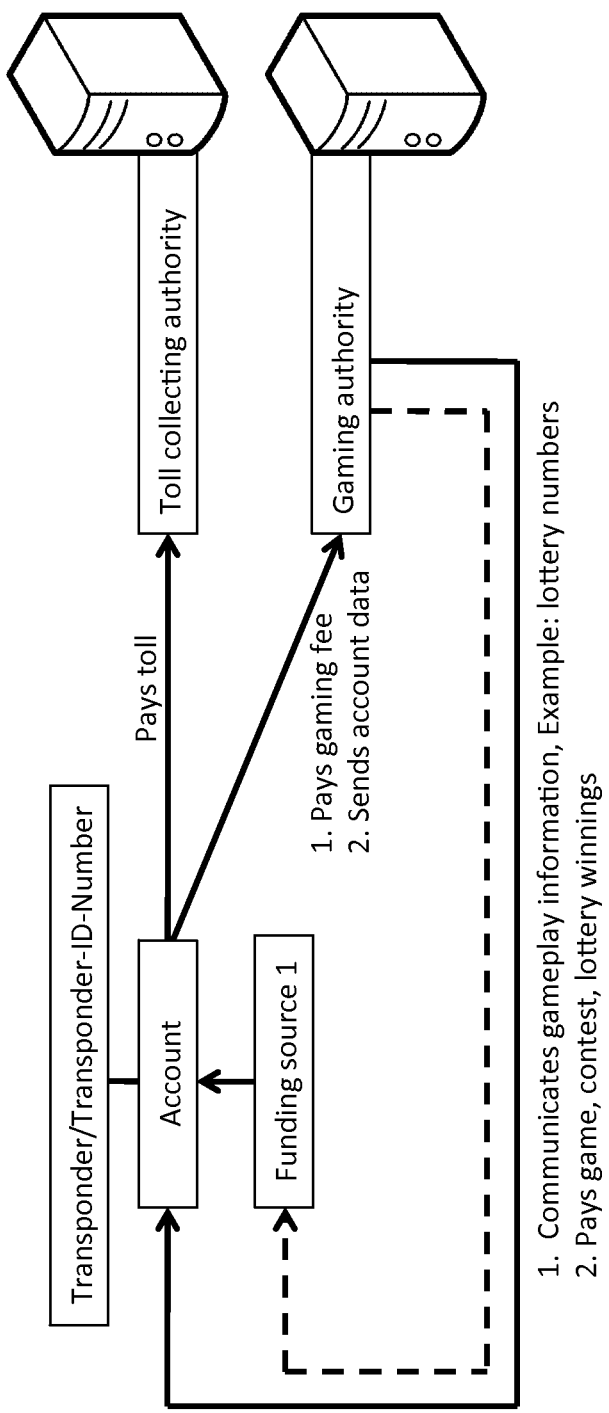
FIG. 11 illustrates exemplary constituent parts in a payment system.

FIG. 11 illustrates a schematic of certain constituent parts of a payment and gaming system comprising an electronic toll collection system. A transponder is shown having a certain Transponder-ID-Number. The Transponder-ID-Number is associated to an account. The account has a funding source, or more than one funding source. FIG. 11 shows part of the method employed once a transponder passes and is read by a transponder reader. A computer or network of computers (each using a processor to run software on non-transitory computer readable media) functions: a) to register the instance of a transponder being read by a transponder reader; b) to then access the account associated with the Transponder-ID-Number, for example to determine the preferences to apply from the account settings pane; c) to make payment from the account to a toll collecting authority; and d) to make payment from the account to a gameplay authority in exchange for gameplay, for example in exchange for an electronic lottery ticket, wherein the electronic lottery ticket numbers are communicated to the account and made available to the account user before the lottery drawing, and wherein the gameplay authority associates an account number with the specific electronic lottery ticket numbers issued as a result of the transaction. FIG. 11 shows the gaming authority may pay winnings directly to the account, or, as shown by the dashed line, to the Funding Source.

As an additional benefit, certain account data, or user data, from the account may be communicated to the gameplay authority. Since lotteries have historically been cash-based games, lottery tickets were purchased anonymously, leaving the gaming authority with little concrete data concerning the base of players, including demographic data, age, gender, frequency of play, frequency of play as a function of the size of the jackpot, regularity of play, location of play by user, time of day in which play occurs by a particular player, and so on. The present payment and gaming system provides benefits over legacy lottery systems, particularly cash based systems with players that are anonymous to the gameplay authority unless a winning ticket is redeemed, and allows the gaming system operator to better understand its players and customers.

In FIG. 11, a representative toll collecting authority is a state agency, perhaps operating in conjunction with other organizations. For example, tolls in Virginia may be collected by the Virginia Department of Transportation, operating in conjunction with the E-ZPass Interagency Group (IAG) using the "E-ZPass" brand electronic toll collection system of transponders and readers. Operation of the system may be contracted to a non-governmental entity, but operation remains supervised and authorized by, for example, the Virginia Department of Transportation. Another representative toll collecting authority is the Metropolitan Washington Airports Authority, operating the Dulles Toll Road (Virginia Route 267) as an 8-lane, 14-mile highway in Northern Virginia.

A representative account in FIG. 11 is the account a user maintains with the E-ZPass Interagency Group (IAG). For example, the Commonwealth of Virginia and E-ZPass cooperate to make information and user accounts available on a website having the URL https://www.ezpassva.com/. Many other embodiments of an account are suitable for use. At least one account functions to meet interoperability requirements among ETC systems, as well as functioning with the greatest number of gameplay authorities to appropriately distribute funds in exchange for electronic gameplay participation.

A representative gameplay authority in FIG. 11 is a state lottery agency or commission, such as the Virginia Lottery, the North Carolina Education Lottery, California Lottery, or the Texas Lottery Commission, among many others. It is not uncommon for these lottery agencies to operate a number of games, including those that may be unique to the specific lottery commission, as well as games that are part of a larger pool of participants and may span several state lottery agencies, for example the popular POWERBALL and MEGAMILLIONS branded lotteries. A gameplay authority may operate any number of games, contests, lotteries or sweepstakes, to include virtual versions of standard game offerings (including virtual "scratch-off" lottery tickets, and similar).

The methods and payment system described provide a voluntary, fun and interesting way to ease the psychological discomfort of paying tolls, in that there now exists an exciting chance that the motorist may reap a great financial gain by traveling toll roads and using a transponder and associated account with account settings. The methods and payment system described may change motorists' perceptions of toll roads, while at the same time potentially providing increased revenue for system operators, who may use the funds to provide better, safer roadways or to augment government budgets for education and other societal betterment objectives.

Additionally, on occasion there are errors that occur within ETC systems and the games, contests, and lotteries described can offset the resultant public relations difficulties. For example, if a funding source of an account is a credit card, and the credit card expires or is cancelled such that replenishment of the account does not happen in a timely fashion yet the transponder is still used to accrue toll liabilities, the toll collecting authority often seeks to collect from the account holder, sometimes with egregious additional fines or penalties. Sometimes, given the number of transponders, errors are made in the collections process, causing either discontent by the user or, worse, public relations problems for the toll collecting authority concerning the efficacy of the payment system itself. While a toll collecting authority will almost always seek to remedy these public relations issues, use of the present payment system to give money back to account holders through games, contests, and lotteries is a source for offsetting positive public relations messages, encouraging use of and confidence in the ETC system.

Purchase of Goods/Services and Use of Rounding Amounts

The transponder may also be used at locations other than toll facilities, for example to pay for fuel at gas stations equipped with pumping islands associated to a transponder reader. The payment system functions substantially similarly to systems described above for toll collecting authorities, substituting the transponder reader at a gas station to activate a fuel pump for transponder reader used by the toll collector. At a gas station, the transponder is read by the reader, a corresponding pre-funded account is located, the gas pump is activated, gas is pumped, the cost of the gas pumped is debited from the account and paid to the gas station, and the electronic lottery-type-ticket is issued to the account in accordance with the account settings. In this manner, every gas station having transponder readers may simultaneously sell electronic lottery tickets with each tank of gas, without having to install cumbersome equipment to dispense paper lottery tickets, without having to safeguard and separate the cash paid for paper lottery tickets, and without having to entice the consumer to go into the gas station to make a separate purchase each time a gas tank is filled.

Moreover, it may be convenient to use rounding amounts to fund lottery-type-ticket purchases, and such an option may be provided in a user's account settings. In operation, a motorist pumps a tank of gas. The volume of gas rarely equates to a round dollar amount. If a whole dollar amount is not displayed, the account settings may direct that a whole dollar amount be debited from the account, with the amount of the change required to meet the next whole dollar amount being used to fund participation in the contest, game, or lottery.

The Rounding Amount

One way to calculate the rounding amount, here sometimes referred to as a micro-donation, is to round each transaction to the nearest dollar. The transaction amount is determined (generally comprising the sale price of the goods or services, plus tax) and then the amount needed to reach the next nearest whole dollar sum is added as the amount donated, for example for participation in a game, contest, or lottery or to a charity.

By way of example, a consumer may purchase a tank of gas that totals, with sales tax, $49.89. Using a transponder as part of the payment system, his account will be charged $50.00 because the charge is rounded to the nearest dollar. The $0.11 micro-donation will be distributed according to the rules and policies adopted by the payment system administrator, examples of which are discussed above.

The rounding amount can also be used to pay for electronic entry into games, contests, sweepstakes, and lotteries. For example, each rounding amount over a pre-determined amount, or threshold value, may earn the participant one lottery-type-ticket. If the amount $0.25 is selected as the amount required to buy one lottery-type-ticket, the payment system, comprising computer hardware and software, determines or calculates the sum total of the rounding amounts in an account in the predetermined time period and divides by $0.25 to determine the total sets of lottery-type-ticket numbers to be awarded to that account holder for that time period. For example, in Week 1 Jane Doe makes one gas purchase for $57.75, and the rounding amount of $0.25 is deducted from the account and paid to the gameplay authority. At the close of the time period, the payment system or gameplay authority calculates a total contribution of $0.25, and outputs to the account a transaction receipt ledger showing in a lottery-type-ticket one set of randomized numbers. In Week 2 Jane Doe makes four gasoline purchases: one for $45.75, donating the rounding amount of $0.25; one for $100.51, donating the rounding amount of $0.49; one for $68.63, donating the rounding amount of $0.37; one for $12.56, donating the rounding amount of $0.44. At the close of the time period, the payment system calculates a total contribution of $1.55, and outputs to the account a transaction receipt ledger showing six lottery-type-ticket sets of randomized numbers eligible to win a lottery jackpot. Jane Doe can view her six lottery-type tickets in her account and compare them to the set of numbers drawn to determine how much she may receive back in the lottery, or how close she came to winning.

Alternatively, in Week 2 Jane Doe makes the same four transponder-based purchases: one for $45.75, donating the rounding amount of $0.25; one for $100.51, donating the rounding amount of $0.49; one for $68.63, donating the rounding amount of $0.37; one for $12.56, donating the rounding amount of $0.44. Rather than waiting until the end of the time period to calculate the total contribution, a transaction receipt with a set of eligibility numbers is provided to the account on a rolling basis. For example, on the first transaction for $45.75, donating the rounding amount of $0.25, one transaction receipt with eligibility numbers is provided, since the $0.25 threshold was met. For the second transaction for $100.51, donating the rounding amount of $0.49, one transaction receipt with eligibility numbers is provided, representing $0.25 of the $0.49, and the remaining $0.24 is held by the gameplay authority and rolled over to be added to rounding amounts from succeeding transactions. On the third transaction for $68.63, donating the rounding amount of $0.37; the rollover amount of $0.24 is added to the $0.37 to total $0.61, resulting in a transaction receipt with two sets of eligibility numbers, representing 2×$0.25, leaving a rollover amount of $0.11, and so on. At the end of the time period, the outstanding rollover amount may either be forfeited to the operator of the payment system or to the gameplay authority, or it may continue to be rolled over into the next time period.

As described above, games, contest, and lotteries may be held where the contestants consist of only those contributing to the potential jackpot by making a purchase in the manner described. Alternatively, contestants gaining eligibility by making a purchase in the manner described may be added to a larger pool of contestants gaining eligibility in a different way, i.e. by buying a lottery ticket in cash.

FURTHER EXEMPLARY EMBODIMENTS

Example 1

Another embodiment is an electronic method for payment for initiating electronic participation in a lottery, contest, game, or sweepstakes, comprising:

providing a transponder, wherein said transponder is associated to an account;
positioning said transponder in reading vicinity of a transponder reader;
reading data from said transponder, said data being communicated to a computer or network of computers;
debiting an account associated with said transponder after said reading step to pay a toll;
debiting an account associated with said transponder after said reading step to electronically enter a lottery, contest, game, or sweepstakes; and
communicating, after said reading step, account data from an account to a gaming authority computer or network of computers, or communicating, after said reading step, data to an account from a gaming authority computer or network of computers.

Another embodiment is the method of Example 1, wherein the transponder is selected from the group comprising a vehicle-mounted passive RFID transponder, a dedicated short range communication transponder, a near field communication transponder, a satellite based navigation-type transponder, and a transponder integrated into the construction of a motor vehicle.

Another embodiment is the method of Example 1, further comprising referencing, after said reading step, an account for account settings, wherein said account settings are configured to facilitate a setting selected from the group comprising:
a) a selection of which lottery, contest, game, or sweepstakes to electronically enter, facilitating entry into one or more lottery, contest, game, or sweepstakes;
b) a selection of the quantity of electronic entries into each available lottery, contest, game, or sweepstakes to electronically enter; and
c) a selection list of predetermined lottery numbers to play.

Another embodiment is the method of Example 1, further comprising conducting, after said reading step, a contest as a raffle among entrants, wherein entrants to said raffle comprise account holders for transponders that have been read by a transponder reader within a predetermined time preceding a raffle drawing.

Another embodiment is the method of Example 1, further comprising
conducting, after said reading step, a game on a computer, wherein the game comprises one selected from the group comprising a virtual slot-machine-type game and a scratch-off-ticket-type game.

Another embodiment is the method of Example 1, further comprising conducting, after said reading step, a game on a computer, wherein the game comprises one selected from the group comprising a virtual slot-machine-type game and a scratch-off-ticket-type game, and wherein a game result is communicated to the transponder, to hardware comprising the transponder, to hardware in communication with the transponder, or to the account.

Another embodiment is the method of Example 1, further comprising conducting, after said reading step, a game on a computer,
wherein the game comprises one selected from the group comprising a virtual slot-machine-type game and a scratch-off-ticket-type game,
wherein a game result is communicated to the transponder, to hardware comprising the transponder, or to hardware in communication with the transponder, and
wherein the game result is displayed on a screen in a motor vehicle.

Another embodiment is the method of Example 1, further comprising communicating the result of a lottery, contest, game, or sweepstakes to the transponder, to hardware comprising the transponder, to hardware in communication with the transponder, or to the account,
wherein said communication occurs at a time that is less than about one minute from said reading step.

Another embodiment is the method of Example 1, further comprising conducting a lottery, wherein said lottery comprises conducting a random drawing and then determining whether there exists at least one winning electronic lottery ticket selected from a group comprising electronic lottery tickets,
wherein said electronic lottery tickets are issued as a result of a transponder having been read by a transponder reader, and
wherein said electronic lottery tickets have been issued within a predetermined time period preceding said random drawing.

Another embodiment is the method of Example 1, further comprising conducting a lottery, contest, game, or sweepstakes; and crediting an account, or a funding source for an account, with an award after conducting a lottery, contest, game, or sweepstakes.

Another embodiment is the method of Example 1, further comprising providing at least one set of lottery numbers after said reading step, wherein an account's account settings comprise a list of predetermined lottery numbers to be provided, and wherein when said list is absent or a null set or wherein each predetermined lottery number from the list has been provided, then providing succeeding lottery numbers by random number generator.

Another embodiment is the method of Example 1, further comprising providing at least one set of lottery numbers after said reading step, wherein said providing at least one set of lottery numbers comprises
a) referencing an account's account settings for a list of predetermined lottery number selections,
b) providing an electronic lottery ticket using the next available set of predetermined lottery numbers from said list, and
c) when said list is absent or a null set or when each predetermined lottery number from the list has been provided, then providing succeeding electronic lottery tickets by using a random number generator to provide the electronic lottery ticket numbers.

Example 2

In another embodiment, there is a payment system for paying tolls and electronically initiating participation in a lottery, contest, game, or sweepstakes, comprising:
a transponder;
a transponder reader capable of reading data from said transponder when located in a reading vicinity, wherein said transponder reader is configured to communicate with a computer or network of computers to facilitate toll collection;
an account associated with said transponder, wherein said account is maintained on a computer or network of computers;
software configured on non-transitory computer readable medium that functions to facilitate payment, from said account, of a toll in at least one toll collecting system, said payment being caused when said transponder is read by said transponder reader; and
software configured on non-transitory computer readable medium that functions to facilitate payment, from said account, to a gameplay authority to facilitate purchase of electronic entry into a lottery, contest, game, or sweepstakes, said payment being caused when said transponder is read by said transponder reader.

Another embodiment is the system of Example 2, wherein said account is a pre-paid account, capable of being replenished by a funding source selected from the group comprising a charge card, a checking account, a savings account, an electronic currency account, and a check.

Another embodiment is the system of Example 2, wherein the transponder is selected from the group comprising a vehicle-mounted passive RFID transponder, a dedicated short range communication transponder, a near field communication transponder, a satellite based navigation-type transponder, and a transponder integrated into the construction of a motor vehicle.

Another embodiment is the system of Example 2, wherein said account is configured to electronically receive a credit in the event of a win in a lottery, contest, game, or sweepstakes.

Another embodiment is the system of Example 2, wherein said account is accessible by computer or mobile computing device, and
wherein said account comprises account settings configured to facilitate a setting selected from the group comprising:
a) a selection of which lottery, contest, game, or sweepstakes to electronically enter, facilitating entry into one or more lottery, contest, game, or sweepstakes;
b) a selection of the quantity of electronic entries into each available lottery, contest, game, or sweepstakes to electronically enter; and
c) a selection list of predetermined lottery numbers to play.

Another embodiment is the system of Example 2, wherein said transponder, or hardware comprising said transponder, comprises a data communicating feature that functions to prevent a purchase ancillary to the payment of a toll or to override account settings.

Another embodiment is the system of Example 2, wherein said transponder, or hardware comprising said transponder, comprises a data communicating feature that functions to prevent a purchase ancillary to the payment of a toll or to override account settings, and wherein said data communicating feature, when activated, functions for either
a) a predetermined period of time or
b) a predetermined number of instances of communication between a transponder and a transponder reader.

Example 3

Another embodiment is a method for purchasing goods or services, comprising:
providing a transponder, wherein said transponder functions in at least one toll collecting system and wherein said transponder is associated to a pre-paid account;
positioning said transponder in reading vicinity of a transponder reader;
reading data from said transponder, said data being communicated to a computer or network of computers;
activating a fuel pump after said reading step;
debiting an account associated with said transponder, after said reading step and after said activating step, for the cost of fuel pumped, and debiting an account associated with said transponder, after said reading step, to electronically enter a lottery, contest, game, or sweepstakes; and communicating, after said reading step, account data to a gaming authority computer or network of computers or communicating, after said reading step, data to an account from a gaming authority computer or network of computers.

Another embodiment is the method of Example 3, wherein the transponder is selected from the group comprising a vehicle-mounted passive RFID transponder, a dedicated short range communication transponder, a near field communication transponder, and a transponder integrated into the construction of a motor vehicle.

Another embodiment is the method of Example 3, further comprising
adding a rounding amount to a purchase made by using said transponder.

Another embodiment is the method of Example 3, further comprising
adding a rounding amount to a purchase made by using said transponder;
determining whether a rounding amount meets a threshold value,
wherein said threshold value, or a multiple of the threshold value, comprises the amount to be debited from the account in said step for debiting an account to electronically enter a contest, game, lottery, or sweepstakes;
aggregating one or more rounding amounts into an aggregate pool; and
distributing at least a portion of said aggregate pool by a contest, sweepstakes, game, or lottery.

Another embodiment is the method of Example 3, further comprising conducting a lottery, contest, game, or sweepstakes; and crediting an account, or an account's funding source, with an award after conducting a lottery, contest, game, or sweepstakes.

Another embodiment is the method of Example 3, further comprising adding a rounding amount to a purchase made by using said transponder;
determining whether a rounding amount sum meets a threshold value,
wherein said threshold value, or a multiple of said threshold value, comprises the amount to be debited from the account in said step for debiting an account to electronically enter a contest, game, lottery, or sweepstakes, and
wherein the difference between the rounding amount and the threshold value is rolled over for addition to successive rounding amounts;
aggregating one or more rounding amounts from more than one account holder into an aggregate pool, and
distributing at least a portion of said aggregate pool by a contest, sweepstakes, game, or lottery.

Example 4

Another embodiment is a method for payment for initiating electronic participation in a lottery, contest, game, or sweepstakes, comprising:
providing a transponder, wherein said transponder is associated to an account;
positioning said transponder in reading vicinity of a transponder reader;
reading data from said transponder;
debiting an account associated with said transponder after said reading step to pay a toll;
debiting an account associated with said transponder after said reading step to electronically enter a lottery, contest, game, or sweepstakes, wherein the sum debited in this debiting step is the difference between the cost of the toll if paid in cash and the cost of the toll if paid by transponder; and
communicating, after said reading step, account data from an account to a gaming authority computer or network of computers, or communicating, after said reading step, data to an account from a gaming authority computer or network of computers.

Example 5

Another embodiment is a method for payment for initiating electronic participation in a lottery, contest, game, or sweepstakes, comprising:
providing a transponder, wherein said transponder is associated to an account;
positioning said transponder in reading vicinity of a transponder reader;
reading data from said transponder;
debiting an account associated with said transponder after said reading step to pay a toll;
debiting an account associated with said transponder after said reading step to electronically enter a lottery, contest, game, or sweepstakes; and
communicating, after said reading step, account data from an account to a gaming authority computer or network of computers.

Example 6

Another embodiment is a method for payment for initiating electronic participation in a lottery, contest, game, or sweepstakes, comprising:
providing a transponder, wherein said transponder is associated to an account;
positioning said transponder in reading vicinity of a transponder reader;
reading data from said transponder;
debiting an account associated with said transponder after said reading step to pay a toll;
debiting an account associated with said transponder after said reading step to electronically enter a lottery, contest, game, or sweepstakes; and
communicating, after said reading step, data to an account from a gaming authority computer or network of computers.

Example 7

Another embodiment is a method for payment for initiating electronic participation in a lottery, contest, game, or sweepstakes, comprising:
providing a transponder, wherein said transponder is associated to an account;
communicating data from said transponder, or from hardware in communication with said transponder, to a computer or network of computers;
determining from said data a distance a vehicle has traveled;
debiting an account associated with said transponder, after said communicating data step, to pay a toll;
debiting an account associated with said transponder, after said communicating data step, to electronically enter a lottery, contest, game, or sweepstakes; and
communicating, after said communicating data step, account data from an account to a gaming authority computer or network of computers, or
communicating, after said reading step, data to an account from a gaming authority computer or network of computers.

Another embodiment is the method of Example 7, wherein said transponder is a satellite based navigation-type transponder.

Another embodiment is the method of Example 7, wherein said transponder is a satellite based navigation-type transponder that periodically logs vehicle location data, wherein said vehicle location data may be used to calculate a distance a vehicle has traveled, and
wherein said distance a vehicle has traveled is used to determine
a) the amount of a toll, applying a toll rate, or
b) whether a predetermined number of miles has been reached, which predetermined number of miles causes a debit of an account associated with said transponder to electronically enter a lottery, contest, game, or sweepstakes.

Another embodiment is the method of Example 7, wherein said transponder is a satellite based navigation-type transponder that periodically logs vehicle location data, and wherein said vehicle location data may be used to calculate a distance a vehicle has traveled on a first type of road, wherein said distance a vehicle has traveled is only on a first type of road is used to determine the amount of a toll, applying a toll rate.

Example 8

Another embodiment is an account settings interface for use in an electronic toll collection and gaming system, the account settings interface comprising:
a selection area for account settings,
wherein said account settings are configured to facilitate a setting selected from the group comprising:
a) a selection of which lottery, contest, game, or sweepstakes to electronically enter from a set, facilitating entry into one or more lottery, contest, game, or sweepstakes;
b) a selection of the quantity of electronic entries into each available lottery, contest, game, or sweepstakes to electronically enter; and
c) a selection list of predetermined lottery numbers to play.

Another embodiment is the account settings interface of Example 8, further comprising
at least one lottery number matrix, wherein said at least one lottery number matrix is configured to facilitate selection of a predetermined number of numbers to be included on an electronic lottery ticket.

Another embodiment is the account settings interface of Example 8, wherein said selection list is a sequential list of lottery numbers to be used when an electronic lottery ticket is purchased and associated to the account.

Another embodiment is the account settings interface of Example 8, further comprising
a report of account activity, wherein said report of account activity comprises one or more entries selected from the group comprising
a) a list of electronic lottery tickets associated to the account,
b) the date upon which an electronic lottery ticket was purchased by use of a transponder in an electronic toll collection system,
c) the amount won by an electronic lottery ticket that was purchased by use of a transponder in an electronic toll collection system,
d) a history of virtual slot machine spin results occurring as a result of use of a transponder in an electronic toll collection system, and
e) a list of tolls paid by the account and the transponder associated to the account resulting in each toll paid.

Example 9

Another embodiment is a method for traffic control using an electronic toll collection system, comprising:
providing a transponder, wherein said transponder is associated to an account;
providing a transponder reader to read a transponder traveling in a first travel lane;
providing a transponder reader to read a transponder traveling in a second travel lane, wherein said first travel lane is a preferred travel lane over said second travel lane;
reading data from a transponder in a travel lane, said data being communicated to a computer or network of computers; and
providing an incentive for travel in said first travel lane over said second travel lane by either
a) after said reading step, providing electronic entrance to a lottery, contest, game, or sweepstakes, wherein said electronic entrance is provided in said first travel lane but not in said second travel lane, or
b) debiting an account associated with a transponder read in said second lane, and not in said first lane, after said reading step to pay a fine or toll.

Another embodiment is the method of Example 9, further comprising
communicating, after said reading step for transponders read in said first travel lane, account data from an account to a gaming authority computer or network of computers, or communicating, after said reading step for transponders read in said first travel lane, data to an account from a gaming authority computer or network of computers.

Another embodiment is the method of Example 9, further comprising
debiting, after said reading step for transponders read in said first travel lane, an account associated with said transponder to electronically enter a lottery, contest, game, or sweepstakes.

Example 10

Another embodiment is a method of conducting a game, contest, or lottery comprising:
operating a computer or network of computers to provide electronic entry to at least one game, contest, or lottery, wherein said computer or network of computers functions to facilitate an electronic entry purchase by use of an electronic toll collection system comprising a transponder, a transponder reader capable of reading data from said transponder, and an account associated with said transponder; and
conducting on a computer or network of computers a game, contest, or lottery by determining a winner from the population comprising those having purchased an electronic entry.

Another embodiment is the method of Example 10, wherein conducting on a computer or network of computers a game comprises conducting a game selected from the group comprising a virtual slot-machine-type game and a scratch-off-ticket-type game.

Another embodiment is the method of Example 10, wherein conducting on a computer or network of computers a game comprises conducting a game selected from the group comprising a virtual slot-machine-type game and a scratch-off-ticket-type game, wherein either a) a virtual slot machine spin is associated to the account corresponding to the transponder used to purchase electronic entry, or b) an electronic scratch-off-type-ticket is associated to the account corresponding to the transponder used to purchase electronic entry.

Example 11

Another embodiment is an electronic method for payment for initiating electronic participation in a lottery, contest, game, or sweepstakes, comprising:
providing a transponder, wherein said transponder is associated to an account;
positioning said transponder in reading vicinity of a transponder reader;
reading data from said transponder, said data being communicated to a computer or network of computers;
debiting an account associated with said transponder after said reading step to pay a toll;
debiting an account associated with said transponder after said reading step to electronically enter a lottery, contest, game, or sweepstakes, wherein the debit is a non-dollar denominated medium of exchange; and
communicating, after said reading step, account data from an account to a gaming authority computer or network of computers, or communicating, after said reading step, data to an account from a gaming authority computer or network of computers.

Another embodiment is the method of Example 11, wherein the non-dollar denominated medium of exchange is selected from the group comprising bitcoin, digital currency, gold, e-gold, digital credits, frequent flier miles, and loyalty points.

Another embodiment is the method of Example 1, further comprising
conducting a lottery,
wherein said lottery comprises conducting a first random drawing and then determining whether there exists at least one winning electronic lottery ticket selected from a group comprising electronic lottery tickets,
wherein said electronic lottery tickets are issued as a result of a transponder having been read by a transponder reader,
wherein said electronic lottery tickets have been issued within a predetermined time period preceding said random drawing and are eligible for a primary award set, and
wherein said electronic lottery tickets do not expire after said first random drawing but remain active for a secondary award set for at least one succeeding random drawing.

Another embodiment is the method of Example 1, further comprising
conducting a lottery,
wherein said lottery comprises conducting a random drawing and then determining whether there exists at least one winning electronic lottery ticket selected from a group comprising electronic lottery tickets,
wherein said electronic lottery tickets are issued as a result of a transponder having been read by a transponder reader,
wherein said electronic lottery tickets have been issued within a predetermined time period preceding said random drawing, and
wherein said lottery functions without bearer-redeemable paper lottery tickets.

Another embodiment is the method of Example 1, further comprising
conducting a lottery among electronic lottery tickets by a first random drawing, wherein said electronic lottery tickets do not expire after said first random drawing but remain eligible for a second random drawing to win a secondary award.

Another embodiment is the method of Example 1, further comprising
conducting a lottery among electronic lottery tickets by a first random drawing, wherein said electronic lottery tickets do not expire after said first random drawing but remain eligible for at least one succeeding random drawing to win a secondary award,
wherein said eligibility for succeeding random drawings is interrupted when the account balance drops below a predetermined amount.

Another embodiment is the method of Example 1, wherein said debiting an account associated with said transponder after said reading step to electronically enter a lottery, contest, game, or sweepstakes step occurs on a periodicity other than every time a toll is paid, said periodicity being determined by reference to an account's account settings.

Another embodiment is the method of Example 1, wherein the data communicated to an account from a gaming authority computer or network of computers comprises a transaction number.

Certain words used in the detailed description are understood to have meaning to include equivalents. For example, the term eligibility numbers is frequently used synonymously with lottery-type ticket or lottery-type numbers, but may be read to encompass eligibility criteria for games, contests, raffles, sweepstakes and lotteries. The winners of the aforementioned may receive monetary payment, or similar, including benefits, rewards, credits, coupons, frequent flier miles, special purchase offers, digital currencies, free toll road passage for a predetermined time, and other similar types of awards not limited to cash. The term vehicle or motor vehicle may include cars, trucks, motorcycles, mopeds, three-wheelers, motorhomes, recreational vehicles, trailers, commercial vehicles, buses, off-highway vehicles, off-road vehicles, construction equipment, and so on. Principles exemplified by one or more embodiments can apply to boats and/or watercraft as vehicles or motor vehicles operating on navigable waterways.

The features and attributes of the specific embodiments disclosed above might be combined in different ways to form additional embodiments, all of which fall within the scope of the present disclosure. Although the present disclosure provides certain embodiments and applications, other embodiments that are apparent to those of ordinary skill in the art, including embodiments that do not provide all of the features and/or advantages set forth herein, are also within the scope of this disclosure.

Any suitable programming language can be used to implement relevant features described herein, including for the account and/or account settings, for the reading, communicating, storing, sorting, aggregating and other actions taken relating to transponder data, account data, toll data, and gameplay data. Different programming techniques can be employed such as procedural or object oriented. The routines can execute on a single processing device or multiple processors. The order of operations described herein can be changed. Multiple operations can be performed at the same time. Any sequence of operations can be interrupted. Any portion of the routines can operate in an operating system environment or as stand-alone routines occupying all, or a substantial part, of the system processing.

Operations can be performed by hardware, firmware, and/or software, as desired. Note that operations can be added to, taken from or modified from the steps in the charts presented in this specification without deviating from the scope of the disclosure. In general, the charts and figures are only used to indicate one possible sequence of basic operations to achieve a function.

In the description herein, numerous specific details are provided, such as examples of components and/or methods, to provide a thorough understanding of at least some of those embodiments described herein. One skilled in the relevant art will recognize, however, that certain embodiments can be practiced without one or more of the specific details, or with other apparatus, systems, assemblies, methods, components, materials, parts, and/or the like. In other instances, well-known structures, materials, and/or operations are not specifically shown or described in detail to avoid obscuring aspects of the described embodiments.

As used herein the various databases, application software or network tools may reside in one or more server computers and more particularly, in the memory of such server computers. As used herein, "memory", for purposes of the described embodiments may be any medium that can contain, store, communicate, propagate, or transport the program for use by or in connection with the instruction execution system, apparatus, system and/or device. The memory can be, by way of example only but not by limitation, an electronic, magnetic, optical, electromagnetic, infrared, or semiconductor system, apparatus, system, device, propagation medium, or computer memory.

As used herein, a "processor" or "process" includes any human, hardware and/or software system, mechanism and/or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "near real time," "offline," "batch mode," etc. Portions of processing can be performed at different times and/or at different locations, by different (or the same) processing systems.

Reference throughout this specification to "one embodiment," "an embodiment," "some embodiments," "a specific embodiment," or a similar phrase, means that a particular feature, structure, and/or characteristic described in connection with the embodiment is included in at least one embodiment and not necessarily in all embodiments. Thus, respective appearances of any of these phrases in various places throughout this specification are not necessarily referring to the same embodiment. Furthermore, the particular features, structures, and/or characteristics of any specific embodiment may be combined in any suitable manner with one or more other embodiments, except where clearly infeasible or impossible. It is to be understood that other variations and/or modifications of the embodiments described and illustrated herein are possible in light of the teachings herein and are to be considered as part of the spirit and scope of the present disclosure.

Embodiments may be implemented by using a programmed general purpose digital computer, by using application specific integrated circuits, programmable logic devices, field programmable gate arrays, optical, chemical, biological, quantum, or nanoengineered systems, components, and/or mechanisms. In general, the functions, principles, and/or concepts described herein can be achieved by non-obviously combining any means as is known in the art. Distributed or networked systems, components and/or circuits can be used. Communication, or transfer, of data may be wired, wireless, and/or by any other means.

It will also be appreciated that one or more of the elements depicted in the drawings/figures can be implemented in a more separated or integrated manner, or even removed or rendered as inoperable in certain cases, as is useful in accordance with a particular application. It is also within the spirit and scope of the present disclosure to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments, including what is described in the Abstract and/or any other section herein, is not intended to be exhaustive or to limit the claimed subject matter to the precise forms disclosed herein. While specific embodiments of, and examples for, certain concepts are described herein for illustrative purposes only, various equivalent modifications are possible within the spirit and scope of the present disclosure, as those skilled in the relevant art will recognize and appreciate. As indicated, these modifications may be made in light of the foregoing description of illustrated embodiments and those modifications are to be included within the spirit and scope of the present disclosure.

Thus, while the present disclosure presents a description reference to particular embodiments, a latitude of modification, various changes and substitutions are intended in the foregoing disclosures, and it will be appreciated that in some instances some features of embodiments will be employed without a corresponding use of other features without departing from the scope and spirit of the disclosure as set forth. Therefore, many modifications may be made to adapt a particular situation or material to the scope and spirit of the present disclosure. It is intended that the claimed subject matter not be limited to the particular embodiments disclosed, including any best mode or preferred embodiment(s), but that the claimed subject matter can include any and all embodiments and equivalents falling within the scope of that claimed subject matter.

What is claimed is:

1. A practical application of an electronic toll collection system configured for paying tolls and electronically initiating participation in a lottery, contest, game, or sweepstakes, said practical application of an electronic toll collection system comprising:

a vehicle-mounted RFID electronic toll collection system transponder, said transponder configured to wirelessly initiate a payment in said electronic toll collection system;

an electronic toll collection system transponder reader, said transponder reader configured to wirelessly read data from said transponder while said transponder is located in, attached to, or integrated into a moving vehicle and as said transponder passes through a reading vicinity of said transponder reader, wherein said transponder reader is configured to communicate with a computer or network of computers to facilitate toll collection;

a pre-funded electronic toll collection system account associated with said transponder and configured to pay a toll transaction and a non-toll transaction, wherein said account is maintained on said computer or network of computers;

first executable program code configured on non-transitory computer readable medium that functions to facilitate a first payment, from said account, to a toll-collecting authority for a toll associated with said electronic toll collection system, said payment being caused when said transponder is read by said transponder reader in a first transponder reading event;

second executable program code configured on non-transitory computer readable medium that functions to facilitate a second payment, from said account, to a gameplay authority to facilitate purchase of electronic entry into said lottery, contest, game, or sweepstakes, said payment being caused when said transponder is read by said transponder reader in said first transponder reading event;

third executable program code configured on non-transitory computer readable medium that functions to substantially simultaneously authorize the debit of said account for said first payment and said second payment;

wherein said account is other than a gaming authority account and other than a financial institution account; and wherein said toll-collecting authority is distinct from said gameplay authority.

2. The system of claim 1, wherein said account is a pre-paid account that is configured to be replenished by a funding source selected from a group comprising a charge card, a checking account, a savings account, an electronic currency account, and a check.

3. The system of claim 1, wherein said transponder is selected from a group comprising a vehicle-mounted passive RFID transponder, an Ultra High Frequency (UHF) transponder, a satellite based navigation-type transponder, a transponder integrated into construction of a motor vehicle, a transponder in an electronic toll collection system.

4. The system of claim 1, wherein said account is configured to electronically receive a credit in the event of a win in said lottery, contest, game, or sweepstakes.

5. The system of claim 1,
wherein said account has account settings accessible by computer or mobile computing device via an account user interface, and wherein said account user interface is configured to facilitate an account setting selected from a group comprising:
 a) a selection of which lottery, contest, game, or sweepstakes to electronically enter, facilitating entry into one or more selected lotteries, contests, games, or sweepstakes;
 b) a selection of a quantity of electronic entries into each of said one or more selected lotteries, contests, games, or sweepstakes; and
 c) a selection list of user-predetermined lottery numbers to play.

6. The system of claim 1, wherein said transponder, or hardware comprising said transponder, comprises a data communicating feature that functions to prevent a purchase ancillary to said payment of said toll or to override account settings.

7. The system of claim 6 wherein, said data communicating feature, when activated, functions for either:
 a) a predetermined period of time, or
 b) a predetermined number of instances of communication between said transponder and said transponder reader.

8. The system of claim 1, wherein said first executable code or said second executable program code is further configured to facilitate said payment in a non-dollar denominated medium of exchange.

9. A practical application of an electronic toll collection system transponder of an electronic toll collection system, comprising the steps:
 providing a vehicle-mounted RFID electronic toll collection system transponder of an electronic toll collection system, wherein said transponder is configured to function in at least one toll collecting system of said electronic toll collection system and wherein said transponder is associated to a pre-funded electronic toll collection system account of said electronic toll collection system;
 providing at least one electronic toll collection system transponder reader of said electronic toll collection system, said transponder reader configured to wirelessly read data from said transponder while said transponder is located in, attached to, or integrated into a moving vehicle and as said transponder passes through a reading vicinity of said transponder reader;
 via a first transponder reading event, wirelessly reading data from said transponder by said at least one transponder reader, said data being communicated to a computer or network of computers;
 activating a fuel dispenser responsive to said reading event;
 debiting said pre-funded account, responsive to said reading event and after said activating, for a cost of fuel dispensed;
 debiting said pre-funded account, responsive to said reading event, for a cost to electronically enter a lottery, contest, game, or sweepstakes; and
 communicating, responsive to said reading event, data from said pre-funded account to a gaming authority's computer or network of computers, or communicating, after said reading step, data to said pre-funded account from a gaming authority's computer or network of computers;
 wherein said account is other than a gaming authority account and other than a financial institution account;
 wherein said debiting for a cost of fuel is authorized via a fuel authorization;
 wherein said debiting for a cost to electronically enter is authorized via an entry authorization; and
 wherein said fuel authorization and said entry authorization occur substantially simultaneously.

10. The method of claim 9, wherein said transponder is selected from a group comprising a vehicle-mounted passive RFID transponder, an Ultra High Frequency (UHF) transponder, a transponder integrated into construction of a motor vehicle, a transponder in an electronic toll collection system.

11. The method of claim 9, further comprising
 adding a rounding amount to a purchase made by using said transponder.

12. The method of claim 11, further comprising determining whether a rounding amount meets a threshold value, wherein said threshold value, or a multiple of said threshold value, comprises an amount to be debited from said pre-funded account for said cost to electronically enter said contest, game, lottery, or sweepstakes;

aggregating one or more rounding amounts into an aggregate pool; and distributing at least a portion of said aggregate pool by said contest, sweepstakes, game, or lottery.

13. The method of claim 9, further comprising conducting said lottery, contest, game, or sweepstakes; and crediting said pre-funded account, or said pre-funded account's funding source, with an award after conducting said lottery, contest, game, or sweepstakes.

14. The method of claim 12, wherein a difference between said rounding amount and said threshold value is rolled over for addition to successive rounding amounts.

15. A practical application of using an electronic toll collection system in a method of conducting a game, contest, or lottery, the practical application comprising:

operating a computer or network of computers to provide an electronic entry to said game, contest, or lottery, wherein said computer or network of computers functions to substantially simultaneously authorize debit of an electronic toll collection system account, of an electronic toll collection system, for a purchase of said electronic entry from a gameplay authority and a payment of a toll to a toll-collecting authority, associated with said electronic toll collection system, for use of said electronic toll collection system, said electronic toll collection system comprising a vehicle-mounted RFID electronic toll collection system transponder, an electronic toll collection system transponder reader configured to wirelessly read data from said transponder when said transponder is associated with, located in, attached to, or integrated into a moving vehicle, and an electronic toll collection system pre-funded account, of said electronic toll collection system, associated with said transponder; and conducting on said computer or network of computers said game, contest, or lottery by determining a winner from a population comprising some or all of those having purchased at least one electronic entry via an electronic toll collection system;

wherein said toll-collecting authority is distinct from said gameplay authority; and wherein said account is other than a gaming authority account and other than a financial institution account.

16. The method of claim 15, wherein said conducting on said computer or network of computers said game comprises conducting a game selection selected from a group comprising a virtual slot-machine-type game and a scratch-off-ticket-type game.

17. The method of claim 16, wherein either a) a virtual slot machine spin is associated to said account, or b) an electronic scratch-off-type-ticket is associated to said account.

18. The method of claim 15, wherein said account has account settings accessible by computer or mobile computing device via an account user interface, and wherein said account user interface is configured to facilitate an account setting selected from a group comprising:

a) a selection of which lottery, contest, game, or sweepstakes to electronically enter, said selection facilitating entry into a selected one or more lotteries, contests, games, or sweepstakes;

b) a selection of a quantity of electronic entries into each of said one or more selected lotteries, contests, games, or sweepstakes; and c) a selection list of user-predetermined lottery numbers to play.

19. The method of claim 18, wherein said account settings interface further comprises at least one lottery number matrix, wherein said at least one lottery number matrix is configured to facilitate selection of a user-predetermined number of numbers to be included on an electronic lottery ticket.

20. The method of claim 18, wherein said selection list comprises predetermined lottery numbers to be provided, wherein at least one entry on said selection list is selected from a group comprising a) a complete set of lottery numbers, wherein each lottery number from said complete set of lottery numbers is user-predetermined, and b) a partially complete set of lottery numbers, wherein at least one lottery number from said partially complete set of lottery numbers is user-predetermined and remaining lottery numbers from said partially complete set of lottery numbers are provided by random number generator.

* * * * *